United States Patent
Mine et al.

[11] Patent Number: 6,154,566
[45] Date of Patent: *Nov. 28, 2000

[54] METHOD AND APPARATUS FOR DETERMINING IMAGE SIMILARITY AND POSITION

[75] Inventors: Naomichi Mine; Yoshihiko Hisamori, both of Kyoto, Japan

[73] Assignee: Omron Corporation, Kyoto, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/856,598

[22] Filed: May 15, 1997

[30] Foreign Application Priority Data

May 15, 1996 [JP] Japan ................................ 8-120278

[51] Int. Cl.⁷ .................................................. G06K 9/68
[52] U.S. Cl. ........................... 382/219; 382/220; 382/151
[58] Field of Search .................................. 382/219, 220, 382/242, 151, 199, 218, 287, 197, 201, 206, 209, 266

[56] References Cited

U.S. PATENT DOCUMENTS

| | | | |
|---|---|---|---|
| 4,553,260 | 11/1985 | Belt et al. | 382/22 |
| 5,033,099 | 7/1991 | Yamada et al. | 382/21 |
| 5,142,592 | 8/1992 | Moler | 382/22 |
| 5,532,828 | 7/1996 | Mirtuse | 358/298 |
| 5,581,673 | 12/1996 | Kikuchi | 395/123 |
| 5,615,287 | 3/1997 | Fu et al. | 382/232 |
| 5,638,465 | 6/1997 | Sano et al. | 382/281 |
| 5,640,237 | 6/1997 | Esrig et al. | 356/237 |
| 5,748,804 | 5/1998 | Surka | 382/291 |
| 5,796,868 | 8/1998 | Dutta-Choudhury | 382/199 |
| 5,828,769 | 10/1998 | Burns | 382/118 |
| 5,867,591 | 2/1999 | Onda | 382/154 |
| 5,936,674 | 8/1999 | Kim | 348/420 |

*Primary Examiner*—Bhavesh Mehta
*Assistant Examiner*—Kanji Patel
*Attorney, Agent, or Firm*—Dickstein Shapiro Morin & Oshinsky LLP

[57] ABSTRACT

An apparatus for determining a similarity between model image and inputted image, which is robust even if the background of said inputted image is partly changed. The similarity is calculated from an edge direction of an inputted image, an edge direction of a model image and a weight related to the model image. The calculating steps used are (1) calculating an edge direction difference between an inputted model image and a model image, (2) calculating weights related to model image, (3) multiplying edge directions and weights, (4) calculating a sum of the multiplication, (5) calculating a sum of the weights, and (6) calculating a similarity by dividing the sum of the multiplication by the sum of the weights.

23 Claims, 46 Drawing Sheets

EDGE DIRECTION OF MODEL IMAGE

EDGE MAGNITUDE OF MODEL IMAGE

MODEL IMAGE

INPUTTED IMAGE

EDGE DIRECTION OF
INPUTTED IMAGE

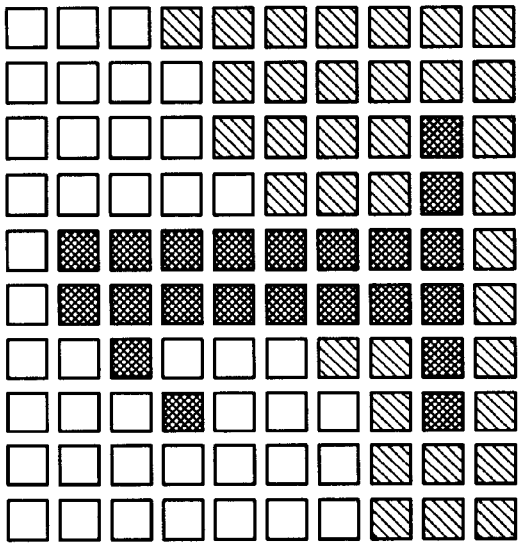
FIG. 6b  INPUTTED IMAGE
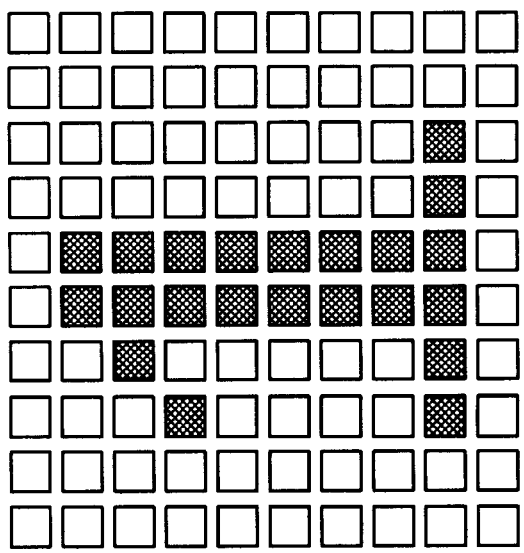
FIG. 6a  MODEL IMAGE

FIG. 6c

| ND  | 225 | 225 | 243 | 315 | 342 | ND  | ND  |
|-----|-----|-----|-----|-----|-----|-----|-----|
| 225 | 225 | 225 | 198 | 180 | 0   | ND  | ND  |
| 180 | 135 | 135 | 162 | 180 | 0   | ND  | ND  |
| 135 | 90  | ND  | 180 | 180 | 0   | ND  | ND  |
| ND  | ND  | ND  | 180 | 180 | 0   | ND  | ND  |
| 270 | 225 | 243 | 180 | 198 | 0   | ND  | ND  |
| 269 | 252 | 252 | 225 | 342 | 315 | 288 | 315 |
| 180 | 180 | 180 | 135 | 108 | 72  | 45  | 0   |

EDGE DIRECTION OF MODEL IMAGE

FIG. 6d

| ND  | 225 | 225 | 243 | 315 | 342 | ND  | ND  | 225 |
|-----|-----|-----|-----|-----|-----|-----|-----|-----|
| 225 | 225 | 225 | 198 | 180 | 0   | ND  | 252 | 243 |
| 180 | 135 | 135 | 162 | 180 | 343 | 343 | 252 | 243 | 252 |
| 135 | 90  | 162 | 180 | 197 | 320 | 292 | 225 | 225 |
| ND  | ND  | 205 | 197 | 220 | 0   | 276 | ND  | ND  |
| 270 | 225 | 243 | 223 | 225 | 0   | 0   | ND  | ND  |
| 269 | 252 | 252 | 225 | 198 | 342 | 315 | 288 | 315 |
| 180 | 180 | 180 | 135 | 108 | 72  | 45  | 0   | 0   |

EDGE MAGNITUDE OF INPUTTED IMAGE

FIG. 6e

| 0   | 283 | 849 | 894 | 849 | 632 | 0   | 0   |
|-----|-----|-----|-----|-----|-----|-----|-----|
| 283 | 566 | 632 | 400 | 800 | 800 | 0   | 0   |
| 400 | 283 | 566 | 632 | 800 | 800 | 0   | 0   |
| 283 | 400 | 632 | 800 | 800 | 800 | 0   | 0   |
| 0   | 0   | 0   | 800 | 800 | 800 | 0   | 0   |
| 0   | 0   | 800 | 800 | 800 | 800 | 0   | 0   |
| 283 | 632 | 849 | 632 | 632 | 849 | 283 | 632 | 283 |
| 400 | 400 | 283 | 632 | 632 | 283 | 400 | 400 |

EDGE MAGNITUDE OF MODEL IMAGE

FIG. 6f $(I_\theta - M_\theta)$

| ND  | 0   | 0   | 0   | 0   | 0   | ND  | ND  | 0   |
|-----|-----|-----|-----|-----|-----|-----|-----|-----|
| 0   | 0   | 0   | 0   | 0   | 0   | ND  | ND  | 0   |
| 0   | 0   | 0   | 0   | 0   | 343 | 343 | ND  | 0   |
| 0   | 0   | 0   | 0   | 17  | 320 | 292 | ND  | 0   |
| ND  | 0   | 25  | 17  | 40  | 0   | 276 | ND  | 0   |
| ND  | ND  | 43  | 40  | 0   | 0   | 0   | ND  | 0   |
| ND  | 44  | 0   | 0   | 0   | 0   | 0   | 0   | 0   |
| 0   | 0   | 0   | 0   | 0   | 0   | 0   | 0   |

FIG. 7a

$f(I_\theta - M_\theta)$

| 0.00 | 0.00 | 0.00 | 0.00 | 0.00 | 0.00 | 1.00 | 1.00 |
|------|------|------|------|------|------|------|------|
| 0.00 | 0.00 | 0.00 | 0.00 | 0.00 | 0.00 | 1.00 | 1.00 |
| 1.00 | 1.00 | 1.00 | 0.96 | 0.37 | 0.10 | 1.00 | 1.00 |
| 1.00 | 1.00 | 1.00 | 0.96 | 0.77 | 1.00 | 1.00 | 1.00 |
| 1.00 | 1.00 | 1.00 | 0.96 | 0.77 | 1.00 | 1.00 | 1.00 |
| 1.00 | 1.00 | 1.00 | 0.91 | 0.73 | 1.00 | 1.00 | 1.00 |
| 1.00 | 1.00 | 1.00 | 0.00 | 0.00 | 1.00 | 1.00 | 1.00 |
| 0.00 | 1.00 | 1.00 | 0.00 | 0.00 | 1.00 | 1.00 | 1.00 |
| 0.00 | 1.00 | 1.00 | 0.72 | 1.00 | 1.00 | 1.00 | 1.00 |

FIG. 7b

$f(I_\theta - M_\theta)$

| 0.00 | 0.00 | 0.00 | 0.00 | 0.00 | 0.00 | 1.00 | 1.00 |
|------|------|------|------|------|------|------|------|
| 0.00 | 0.00 | 0.00 | 0.00 | 0.00 | 0.00 | 1.00 | 1.00 |
| 1.00 | 1.00 | 1.00 | 1.00 | 0.00 | 0.00 | 1.00 | 1.00 |
| 1.00 | 1.00 | 1.00 | 1.00 | 1.00 | 1.00 | 1.00 | 1.00 |
| 1.00 | 1.00 | 1.00 | 1.00 | 1.00 | 1.00 | 1.00 | 1.00 |
| 1.00 | 1.00 | 1.00 | 1.00 | 1.00 | 1.00 | 1.00 | 1.00 |
| 1.00 | 1.00 | 1.00 | 1.00 | 0.00 | 0.00 | 1.00 | 1.00 |
| 0.00 | 1.00 | 1.00 | 1.00 | 0.00 | 0.00 | 1.00 | 1.00 |

FIG. 8a — MODEL IMAGE

| 200 | 200 | 200 | 200 | 200 | 200 | 200 | 200 | 200 | 200 |
|---|---|---|---|---|---|---|---|---|---|
| 200 | 200 | 200 | 200 | 200 | 200 | 200 | 200 | 200 | 200 |
| 200 | 200 | 200 | 0   | 0   | 0   | 0   | 0   | 0   | 200 |
| 200 | 200 | 0   | 200 | 0   | 0   | 0   | 0   | 0   | 200 |
| 200 | 0   | 200 | 200 | 0   | 200 | 200 | 200 | 0   | 200 |
| 200 | 0   | 200 | 200 | 0   | 200 | 200 | 200 | 0   | 200 |
| 200 | 0   | 200 | 200 | 0   | 200 | 200 | 200 | 0   | 200 |
| 200 | 0   | 200 | 200 | 0   | 200 | 200 | 200 | 0   | 200 |
| 200 | 200 | 0   | 0   | 0   | 0   | 0   | 0   | 200 | 200 |
| 200 | 200 | 200 | 200 | 200 | 200 | 200 | 200 | 200 | 200 |
| 200 | 200 | 200 | 200 | 200 | 200 | 200 | 200 | 200 | 200 |

FIG. 8b — INPUTTED IMAGE

| 40  | 50  | 60  | 70  | 80  | 90  | 100 | 110 | 120 | 130 |
|---|---|---|---|---|---|---|---|---|---|
| 50  | 60  | 70  | 80  | 90  | 100 | 110 | 120 | 130 | 140 |
| 60  | 70  | 80  | 0   | 100 | 110 | 120 | 130 | 0   | 150 |
| 70  | 80  | 0   | 100 | 110 | 120 | 130 | 140 | 0   | 160 |
| 80  | 0   | 0   | 0   | 0   | 0   | 0   | 0   | 170 | 180 |
| 90  | 0   | 0   | 0   | 0   | 0   | 0   | 0   | 180 | 190 |
| 100 | 110 | 120 | 130 | 140 | 150 | 160 | 170 | 0   | 200 |
| 110 | 120 | 130 | 140 | 150 | 160 | 170 | 180 | 0   | 210 |
| 120 | 130 | 140 | 150 | 160 | 170 | 180 | 190 | 200 | 210 |
| 130 | 140 | 150 | 160 | 170 | 180 | 190 | 200 | 210 | 220 |

EDGE DIRECTION OF MODEL IMAGE

EDGE MAGNITUDE OF MODEL IMAGE

MODEL IMAGE

INPUTTED IMAGE

EDGE DIRECTION OF
INPUTTED IMAGE

MODEL IMAGE (CHARACTER "3")

EDGE MAGNITUDE OF MODEL IMAGE

EDGE DIRECTION OF MODEL IMAGE

INPUTTED IMAGE

EDGE DIRECTION OF INPUTTED IMAGE

EMBOSSED CHARACTER "1"

CROSS SECTION WHICH IS LIGHTED FROM RIGHT DIRECTION

CROSS SECTION WHICH IS LIGHTED FROM LEFT DIRECTION

INPUTTED IMAGE WHICH IS LIGHTED FROM RIGHT DIRECTION

INPUTTED IMAGE WHICH IS LIGHTED FROM LEFT DIRECTION

EDGE DIRECTION OF INPUTTED IMAGE WHICH IS LIGHTED FROM RIGHT DIRECTION

EDGE DIRECTION OF INPUTTED IMAGE WHICH IS LIGHTED FROM LEFT DIRECTION

FIG. 20a

| 100 | 100 | 100 | 100 | 100 | 100 | 100 | 100 | 100 | 100 |
|---|---|---|---|---|---|---|---|---|---|
| 100 | 100 | 100 | 100 | 100 | 100 | 100 | 100 | 100 | 100 |
| 100 | 100 | 100 | 200 | 200 | 0 | 0 | 100 | 100 | 100 |
| 100 | 100 | 100 | 200 | 200 | 0 | 0 | 100 | 100 | 100 |
| 100 | 100 | 100 | 200 | 200 | 0 | 0 | 100 | 100 | 100 |
| 100 | 100 | 100 | 200 | 200 | 0 | 0 | 100 | 100 | 100 |
| 100 | 100 | 100 | 200 | 200 | 0 | 0 | 100 | 100 | 100 |
| 100 | 100 | 100 | 200 | 200 | 0 | 0 | 100 | 100 | 100 |
| 100 | 100 | 100 | 100 | 100 | 100 | 100 | 100 | 100 | 100 |
| 100 | 100 | 100 | 100 | 100 | 100 | 100 | 100 | 100 | 100 |

MODEL IMAGE DATA

FIG. 20b

| 0 | 0 | 0 | 0 | 0 | 0 | 0 | 0 | 0 | 0 |
|---|---|---|---|---|---|---|---|---|---|
| 0 | 0 | 141 | 316 | 283 | 283 | 316 | 141 | 0 | 0 |
| 0 | 0 | 316 | 424 | 632 | 632 | 424 | 316 | 0 | 0 |
| 0 | 0 | 400 | 400 | 800 | 800 | 400 | 400 | 0 | 0 |
| 0 | 0 | 400 | 400 | 800 | 800 | 400 | 400 | 0 | 0 |
| 0 | 0 | 400 | 400 | 800 | 800 | 400 | 400 | 0 | 0 |
| 0 | 0 | 400 | 400 | 800 | 800 | 400 | 400 | 0 | 0 |
| 0 | 0 | 316 | 424 | 632 | 632 | 424 | 316 | 0 | 0 |
| 0 | 0 | 141 | 316 | 283 | 283 | 316 | 141 | 0 | 0 |
| 0 | 0 | 0 | 0 | 0 | 0 | 0 | 0 | 0 | 0 |

EDGE MAGNITUDE DATA OF
MODEL IMAGE ($M_W$)

FIG. 21a

| ND | ND | ND  | ND  | ND  | ND  | ND  | ND  | ND | ND |
|----|----|-----|-----|-----|-----|-----|-----|----|----|
| ND | ND | 315 | 288 | 225 | 135 | 72  | 45  | ND | ND |
| ND | ND | 342 | 315 | 198 | 162 | 45  | 18  | ND | ND |
| ND | ND | 0   | 0   | 180 | 180 | 0   | 0   | ND | ND |
| ND | ND | 0   | 0   | 180 | 180 | 0   | 0   | ND | ND |
| ND | ND | 0   | 0   | 180 | 180 | 0   | 0   | ND | ND |
| ND | ND | 0   | 0   | 180 | 180 | 0   | 0   | ND | ND |
| ND | ND | 18  | 45  | 162 | 198 | 315 | 342 | ND | ND |
| ND | ND | 45  | 72  | 135 | 225 | 288 | 315 | ND | ND |
| ND | ND | ND  | ND  | ND  | ND  | ND  | ND  | ND | ND |

EDGE DIRECTION DATA OF MODEL IMAGE ( Mθ )

FIG. 21b

| 100 | 100 | 100 | 100 | 100 | 100 | 100 | 100 | 100 | 100 |
|-----|-----|-----|-----|-----|-----|-----|-----|-----|-----|
| 100 | 100 | 100 | 100 | 100 | 100 | 100 | 100 | 100 | 100 |
| 100 | 100 | 100 | 0   | 0   | 200 | 200 | 100 | 100 | 100 |
| 100 | 100 | 100 | 0   | 0   | 200 | 200 | 100 | 100 | 100 |
| 100 | 100 | 100 | 0   | 0   | 200 | 200 | 100 | 100 | 100 |
| 100 | 100 | 100 | 0   | 0   | 200 | 200 | 100 | 100 | 100 |
| 100 | 100 | 100 | 0   | 0   | 200 | 200 | 100 | 100 | 100 |
| 100 | 100 | 100 | 0   | 0   | 200 | 200 | 100 | 100 | 100 |
| 100 | 100 | 100 | 100 | 100 | 100 | 100 | 100 | 100 | 100 |
| 100 | 100 | 100 | 100 | 100 | 100 | 100 | 100 | 100 | 100 |

INPUTED IMAGE DATA

FIG. 21c

| ND | ND | ND  | ND  | ND  | ND  | ND  | ND  | ND | ND |
|----|----|-----|-----|-----|-----|-----|-----|----|----|
| ND | ND | 135 | 108 | 45  | 315 | 252 | 225 | ND | ND |
| ND | ND | 162 | 135 | 18  | 342 | 225 | 198 | ND | ND |
| ND | ND | 180 | 180 | 0   | 0   | 180 | 180 | ND | ND |
| ND | ND | 180 | 180 | 0   | 0   | 180 | 180 | ND | ND |
| ND | ND | 180 | 180 | 0   | 0   | 180 | 180 | ND | ND |
| ND | ND | 180 | 180 | 0   | 0   | 180 | 180 | ND | ND |
| ND | ND | 198 | 225 | 342 | 18  | 135 | 162 | ND | ND |
| ND | ND | 225 | 252 | 315 | 45  | 108 | 135 | ND | ND |
| ND | ND | ND  | ND  | ND  | ND  | ND  | ND  | ND | ND |

EDGE DIRECTION DATA OF INPUTED IMAGE

FIG. 22a

| ND | ND | ND | ND | ND | ND | ND | ND | ND | ND |
|---|---|---|---|---|---|---|---|---|---|
| ND | ND | −180 | −180 | −180 | 180 | 180 | 180 | ND | ND |
| ND | ND | −180 | −180 | −180 | 180 | 180 | 180 | ND | ND |
| ND | ND | 180 | 180 | −180 | −180 | 180 | 180 | ND | ND |
| ND | ND | 180 | 180 | −180 | −180 | 180 | 180 | ND | ND |
| ND | ND | 180 | 180 | −180 | −180 | 180 | 180 | ND | ND |
| ND | ND | 180 | 180 | −180 | −180 | 180 | 180 | ND | ND |
| ND | ND | 180 | 180 | 180 | −180 | −180 | −180 | ND | ND |
| ND | ND | 180 | 180 | 180 | −180 | −180 | −180 | ND | ND |
| ND | ND | ND | ND | ND | ND | ND | ND | ND | ND |

$(I\theta - M\theta)$

FIG. 22b

| ND | ND | ND | ND | ND | ND | ND | ND | ND | ND |
|---|---|---|---|---|---|---|---|---|---|
| ND | ND | −360 | −360 | −360 | 360 | 360 | 360 | ND | ND |
| ND | ND | −360 | −360 | −360 | 360 | 360 | 360 | ND | ND |
| ND | ND | 360 | 360 | −360 | −360 | 360 | 360 | ND | ND |
| ND | ND | 360 | 360 | −360 | −360 | 360 | 360 | ND | ND |
| ND | ND | 360 | 360 | −360 | −360 | 360 | 360 | ND | ND |
| ND | ND | 360 | 360 | −360 | −360 | 360 | 360 | ND | ND |
| ND | ND | 360 | 360 | 360 | −360 | −360 | −360 | ND | ND |
| ND | ND | 360 | 360 | 360 | −360 | −360 | −360 | ND | ND |
| ND | ND | ND | ND | ND | ND | ND | ND | ND | ND |

$2 \times (I\theta - M\theta)$

FIG. 22c

| 0.00 | 0.00 | 0.00 | 0.00 | 0.00 | 0.00 | 0.00 | 0.00 | 0.00 | 0.00 |
|---|---|---|---|---|---|---|---|---|---|
| 0.00 | 0.00 | 1.00 | 1.00 | 1.00 | 1.00 | 1.00 | 1.00 | 0.00 | 0.00 |
| 0.00 | 0.00 | 1.00 | 1.00 | 1.00 | 1.00 | 1.00 | 1.00 | 0.00 | 0.00 |
| 0.00 | 0.00 | 1.00 | 1.00 | 1.00 | 1.00 | 1.00 | 1.00 | 0.00 | 0.00 |
| 0.00 | 0.00 | 1.00 | 1.00 | 1.00 | 1.00 | 1.00 | 1.00 | 0.00 | 0.00 |
| 0.00 | 0.00 | 1.00 | 1.00 | 1.00 | 1.00 | 1.00 | 1.00 | 0.00 | 0.00 |
| 0.00 | 0.00 | 1.00 | 1.00 | 1.00 | 1.00 | 1.00 | 1.00 | 0.00 | 0.00 |
| 0.00 | 0.00 | 1.00 | 1.00 | 1.00 | 1.00 | 1.00 | 1.00 | 0.00 | 0.00 |
| 0.00 | 0.00 | 1.00 | 1.00 | 1.00 | 1.00 | 1.00 | 1.00 | 0.00 | 0.00 |
| 0.00 | 0.00 | 0.00 | 0.00 | 0.00 | 0.00 | 0.00 | 0.00 | 0.00 | 0.00 |

$\cos(2 \times (I\theta - M\theta))$

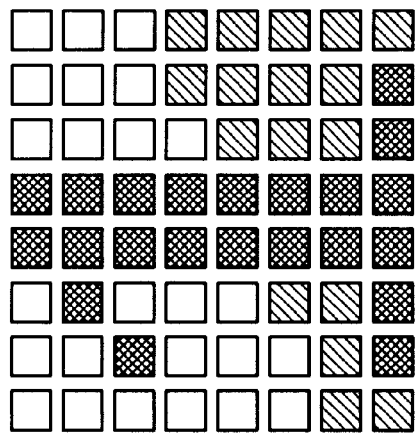
FIG. 25c
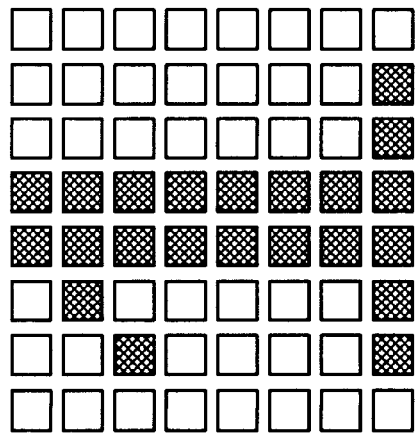
FIG. 25b
FIG. 25a

IMAGE 0

(MARK ON PLAIN SURFACE)

IMAGE 4

IMAGE 3

IMAGE 2

IMAGE 1

(MARK ON BACKGROUND PATTERN)

FIG. 28b

IMAGE 0 : EDGE MAGNITUDE

| 0 | 0 | 0 | 0 | 0 | 0 | 0 | 0 | 0 | 0 | 0 | 0 | 0 | 0 |
|---|---|---|---|---|---|---|---|---|---|---|---|---|---|
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 5 | 5 | 5 | 5 | 5 | 5 | 5 | 5 | 0 | 0 | 0 |
| 0 | 0 | 0 | 5 | 0 | 0 | 0 | 0 | 0 | 0 | 5 | 0 | 0 | 0 |
| 0 | 0 | 0 | 5 | 0 | 0 | 0 | 0 | 0 | 0 | 5 | 0 | 0 | 0 |
| 0 | 0 | 0 | 5 | 0 | 0 | 0 | 0 | 0 | 0 | 5 | 0 | 0 | 0 |
| 0 | 0 | 0 | 5 | 0 | 0 | 0 | 0 | 0 | 0 | 5 | 0 | 0 | 0 |
| 0 | 0 | 0 | 5 | 0 | 0 | 0 | 0 | 0 | 0 | 5 | 0 | 0 | 0 |
| 0 | 0 | 0 | 5 | 0 | 0 | 0 | 0 | 0 | 0 | 5 | 0 | 0 | 0 |
| 0 | 0 | 0 | 5 | 5 | 5 | 5 | 5 | 5 | 5 | 5 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |

IMAGE 1 : EDGE DIRECTION

IMAGE 2 : EDGE DIRECTION

IMAGE 3 : EDGE DIRECTION

IMAGE 4 : EDGE DIRECTION

FIG. 29f

IMAGE 2 : EDGE MAGNITUDE

| 0 | 0 | 0 | 0 | 0 | 0 | 0 | 0 | 0 | 0 | 0 | 0 | 0 | 0 |
|---|---|---|---|---|---|---|---|---|---|---|---|---|---|
| 0 | 0 | 0 | 0 | 0 | 0 | 0 | 0 | 2 | 2 | 2 | 2 | 2 | 0 |
| 0 | 0 | 0 | 0 | 0 | 0 | 0 | 0 | 2 | 0 | 0 | 0 | 2 | 0 |
| 0 | 0 | 0 | 5 | 5 | 5 | 5 | 5 | 4 | 3 | 3 | 0 | 2 | 0 |
| 0 | 0 | 0 | 5 | 0 | 0 | 0 | 0 | 0 | 0 | 3 | 0 | 2 | 0 |
| 0 | 0 | 0 | 5 | 0 | 0 | 0 | 0 | 0 | 0 | 4 | 2 | 2 | 0 |
| 0 | 0 | 0 | 5 | 0 | 0 | 0 | 0 | 0 | 0 | 5 | 0 | 0 | 0 |
| 0 | 0 | 0 | 5 | 0 | 0 | 0 | 0 | 0 | 0 | 5 | 0 | 0 | 0 |
| 0 | 0 | 0 | 5 | 0 | 0 | 0 | 0 | 0 | 0 | 5 | 0 | 0 | 0 |
| 0 | 0 | 0 | 5 | 0 | 0 | 0 | 0 | 0 | 0 | 5 | 0 | 0 | 0 |
| 0 | 0 | 0 | 5 | 5 | 5 | 5 | 5 | 5 | 5 | 5 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |

FIG. 29e

IMAGE 1 : EDGE MAGNITUDE

| 0 | 0 | 0 | 0 | 0 | 0 | 0 | 0 | 0 | 0 | 0 | 0 | 0 | 0 |
|---|---|---|---|---|---|---|---|---|---|---|---|---|---|
| 0 | 2 | 2 | 2 | 2 | 2 | 0 | 0 | 0 | 0 | 0 | 0 | 0 | 0 |
| 0 | 2 | 0 | 0 | 0 | 2 | 0 | 0 | 0 | 0 | 0 | 0 | 0 | 0 |
| 0 | 2 | 0 | 3 | 3 | 4 | 5 | 5 | 5 | 5 | 5 | 0 | 0 | 0 |
| 0 | 2 | 0 | 3 | 0 | 0 | 0 | 0 | 0 | 0 | 5 | 0 | 0 | 0 |
| 0 | 2 | 2 | 4 | 0 | 0 | 0 | 0 | 0 | 0 | 5 | 0 | 0 | 0 |
| 0 | 0 | 0 | 5 | 0 | 0 | 0 | 0 | 0 | 0 | 5 | 0 | 0 | 0 |
| 0 | 0 | 0 | 5 | 0 | 0 | 0 | 0 | 0 | 0 | 5 | 0 | 0 | 0 |
| 0 | 0 | 0 | 5 | 0 | 0 | 0 | 0 | 0 | 0 | 5 | 0 | 0 | 0 |
| 0 | 0 | 0 | 5 | 0 | 0 | 0 | 0 | 0 | 0 | 5 | 0 | 0 | 0 |
| 0 | 0 | 0 | 5 | 5 | 5 | 5 | 5 | 5 | 5 | 5 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |

FIG. 29h

IMAGE 4 : EDGE MAGNITUDE

FIG. 29g

IMAGE 3 : EDGE MAGNITUDE

FIG. 37

REPRESENTATIVE EDGE DIRECTION DATA

| 135 | 90  | 90  | 90  | 45  |     |     | 135 | 90  | 90  | 90  | 45  |
| 180 |     |     |     | 0   |     |     | 180 |     |     |     | 0   |
| 180 |     | 135 | 90  | 79  | 90  | 90  | 101 | 90  | 45  |     | 0   |
| 180 |     | 180 |     |     |     |     |     |     | 0   |     | 0   |
| 225 | 270 | 191 |     |     |     |     |     |     | 349 | 270 | 315 |
|     |     | 180 |     |     |     |     |     |     | 0   |     |     |
|     |     | 180 |     |     |     |     |     |     | 0   |     |     |
| 135 | 90  | 169 |     |     |     |     |     |     | 11  | 90  | 45  |
| 180 |     | 180 |     |     |     |     |     |     | 0   |     | 0   |
| 180 |     | 225 | 270 | 281 | 270 | 270 | 259 | 270 | 315 |     | 0   |
| 180 |     |     |     | 0   |     |     | 180 |     |     |     | 0   |
| 225 | 270 | 270 | 270 | 315 |     |     | 225 | 270 | 270 | 270 | 315 |

FIG. 38

REPRESENTATIVE EDGE MAGNITUDE DATA

| 0.00 | 0.00 | 0.00 | 0.00 | 0.00 | 0.00 | 0.00 | 0.00 | 0.00 | 0.00 | 0.00 | 0.00 | 0.00 | 0.00 |
|------|------|------|------|------|------|------|------|------|------|------|------|------|------|
| 0.00 | 0.50 | 0.50 | 0.50 | 0.50 | 0.50 | 0.00 | 0.00 | 0.50 | 0.50 | 0.50 | 0.50 | 0.50 | 0.00 |
| 0.00 | 0.50 | 0.00 | 0.00 | 0.00 | 0.50 | 0.00 | 0.00 | 0.50 | 0.00 | 0.00 | 0.00 | 0.50 | 0.00 |
| 0.00 | 0.50 | 0.00 | 4.50 | 4.50 | 4.75 | 5.00 | 5.00 | 4.75 | 4.50 | 4.50 | 0.00 | 0.50 | 0.00 |
| 0.00 | 0.50 | 0.00 | 4.50 | 0.00 | 0.00 | 0.00 | 0.00 | 0.00 | 0.00 | 4.50 | 0.00 | 0.50 | 0.00 |
| 0.00 | 0.50 | 0.50 | 4.75 | 0.00 | 0.00 | 0.00 | 0.00 | 0.00 | 0.00 | 4.75 | 0.50 | 0.50 | 0.00 |
| 0.00 | 0.00 | 0.00 | 5.00 | 0.00 | 0.00 | 0.00 | 0.00 | 0.00 | 0.00 | 5.00 | 0.00 | 0.00 | 0.00 |
| 0.00 | 0.00 | 0.00 | 5.00 | 0.00 | 0.00 | 0.00 | 0.00 | 0.00 | 0.00 | 5.00 | 0.00 | 0.00 | 0.00 |
| 0.00 | 0.50 | 0.50 | 4.50 | 0.00 | 0.00 | 0.00 | 0.00 | 0.00 | 0.00 | 4.75 | 0.50 | 0.50 | 0.00 |
| 0.00 | 0.50 | 0.00 | 4.75 | 0.00 | 0.00 | 0.00 | 0.00 | 0.00 | 0.00 | 4.50 | 0.00 | 0.50 | 0.00 |
| 0.00 | 0.50 | 0.00 | 4.75 | 4.75 | 4.50 | 5.00 | 5.00 | 4.75 | 4.50 | 4.50 | 0.00 | 0.50 | 0.00 |
| 0.00 | 0.50 | 0.00 | 0.00 | 0.00 | 0.50 | 0.00 | 0.00 | 0.50 | 0.00 | 0.00 | 0.00 | 0.50 | 0.00 |
| 0.00 | 0.50 | 0.50 | 0.50 | 0.50 | 0.50 | 0.00 | 0.00 | 0.50 | 0.50 | 0.50 | 0.50 | 0.50 | 0.00 |
| 0.00 | 0.00 | 0.00 | 0.00 | 0.00 | 0.00 | 0.00 | 0.00 | 0.00 | 0.00 | 0.00 | 0.00 | 0.00 | 0.00 |

FIG. 39

REPRESENTATIVE EDGE MAGNITUDE

| 0.00 | 0.00 | 0.00 | 0.00 | 0.00 | 0.00 | 0.00 | 0.00 | 0.00 | 0.00 | 0.00 | 0.00 | 0.00 | 0.00 |
|---|---|---|---|---|---|---|---|---|---|---|---|---|---|
| 0.00 | 0.50 | 0.50 | 0.50 | 0.50 | 0.50 | 0.00 | 0.00 | 0.50 | 0.50 | 0.50 | 0.50 | 0.50 | 0.00 |
| 0.00 | 0.50 | 0.00 | 0.00 | 0.00 | 0.50 | 0.00 | 0.00 | 0.50 | 0.00 | 0.00 | 0.00 | 0.50 | 0.00 |
| 0.00 | 0.50 | 0.00 | 4.50 | 4.50 | 4.51 | 5.00 | 5.00 | 4.51 | 4.50 | 4.50 | 0.00 | 0.50 | 0.00 |
| 0.00 | 0.50 | 0.00 | 4.50 | 0.00 | 0.00 | 0.00 | 0.00 | 0.00 | 0.00 | 4.50 | 0.00 | 0.50 | 0.00 |
| 0.00 | 0.50 | 0.50 | 4.51 | 0.00 | 0.00 | 0.00 | 0.00 | 0.00 | 0.00 | 4.51 | 0.50 | 0.50 | 0.00 |
| 0.00 | 0.00 | 0.00 | 5.00 | 0.00 | 0.00 | 0.00 | 0.00 | 0.00 | 0.00 | 5.00 | 0.00 | 0.00 | 0.00 |
| 0.00 | 0.00 | 0.00 | 5.00 | 0.00 | 0.00 | 0.00 | 0.00 | 0.00 | 0.00 | 5.00 | 0.00 | 0.00 | 0.00 |
| 0.00 | 0.50 | 0.50 | 4.30 | 0.00 | 0.00 | 0.00 | 0.00 | 0.00 | 0.00 | 4.51 | 0.50 | 0.50 | 0.00 |
| 0.00 | 0.50 | 0.00 | 4.75 | 0.00 | 0.00 | 0.00 | 0.00 | 0.00 | 0.00 | 4.50 | 0.00 | 0.50 | 0.00 |
| 0.00 | 0.50 | 0.00 | 4.75 | 4.75 | 4.30 | 5.00 | 5.00 | 4.51 | 4.50 | 4.50 | 0.00 | 0.50 | 0.00 |
| 0.00 | 0.50 | 0.00 | 0.00 | 0.00 | 0.50 | 0.00 | 0.00 | 0.50 | 0.00 | 0.00 | 0.00 | 0.50 | 0.00 |
| 0.00 | 0.50 | 0.50 | 0.50 | 0.50 | 0.50 | 0.00 | 0.00 | 0.50 | 0.50 | 0.50 | 0.50 | 0.50 | 0.00 |
| 0.00 | 0.00 | 0.00 | 0.00 | 0.00 | 0.00 | 0.00 | 0.00 | 0.00 | 0.00 | 0.00 | 0.00 | 0.00 | 0.00 |

FIG. 40

REPRESENTATIVE EDGE MAGNITUDE

| 0.00 | 0.00 | 0.00 | 0.00 | 0.00 | 0.00 | 0.00 | 0.00 | 0.00 | 0.00 | 0.00 | 0.00 | 0.00 | 0.00 |
|---|---|---|---|---|---|---|---|---|---|---|---|---|---|
| 0.00 | 0.13 | 0.13 | 0.13 | 0.13 | 0.13 | 0.00 | 0.00 | 0.13 | 0.13 | 0.13 | 0.13 | 0.13 | 0.00 |
| 0.00 | 0.13 | 0.00 | 0.00 | 0.00 | 0.13 | 0.00 | 0.00 | 0.13 | 0.00 | 0.00 | 0.00 | 0.13 | 0.00 |
| 0.00 | 0.13 | 0.00 | 4.50 | 4.50 | 4.26 | 5.00 | 5.00 | 4.26 | 4.50 | 4.50 | 0.00 | 0.13 | 0.00 |
| 0.00 | 0.13 | 0.00 | 4.50 | 0.00 | 0.00 | 0.00 | 0.00 | 0.00 | 0.00 | 4.50 | 0.00 | 0.13 | 0.00 |
| 0.00 | 0.12 | 0.12 | 4.26 | 0.00 | 0.00 | 0.00 | 0.00 | 0.00 | 0.00 | 4.26 | 0.12 | 0.12 | 0.00 |
| 0.00 | 0.00 | 0.00 | 5.00 | 0.00 | 0.00 | 0.00 | 0.00 | 0.00 | 0.00 | 5.00 | 0.00 | 0.00 | 0.00 |
| 0.00 | 0.00 | 0.00 | 5.00 | 0.00 | 0.00 | 0.00 | 0.00 | 0.00 | 0.00 | 5.00 | 0.00 | 0.00 | 0.00 |
| 0.00 | 0.13 | 0.13 | 4.06 | 0.00 | 0.00 | 0.00 | 0.00 | 0.00 | 0.00 | 4.26 | 0.13 | 0.13 | 0.00 |
| 0.00 | 0.13 | 0.00 | 4.75 | 0.00 | 0.00 | 0.00 | 0.00 | 0.00 | 0.00 | 4.50 | 0.00 | 0.13 | 0.00 |
| 0.00 | 0.13 | 0.00 | 4.75 | 4.75 | 4.06 | 5.00 | 5.00 | 4.26 | 4.50 | 4.50 | 0.00 | 0.13 | 0.00 |
| 0.00 | 0.13 | 0.00 | 0.00 | 0.00 | 0.13 | 0.00 | 0.00 | 0.13 | 0.00 | 0.00 | 0.00 | 0.13 | 0.00 |
| 0.00 | 0.12 | 0.12 | 0.12 | 0.12 | 0.12 | 0.00 | 0.00 | 0.12 | 0.12 | 0.12 | 0.12 | 0.12 | 0.00 |
| 0.00 | 0.00 | 0.00 | 0.00 | 0.00 | 0.00 | 0.00 | 0.00 | 0.00 | 0.00 | 0.00 | 0.00 | 0.00 | 0.00 |

METHOD AND APPARATUS FOR DETERMINING IMAGE SIMILARITY AND POSITION

BACKGROUND OF THE INVENTION

1. Field of the Invention

The present invention relates to a method and apparatus which calculates a similarity between an inputted image and a model image, and to a method apparatus for detecting a position of the inputted image, using the above-calculated similarity.

2. Discussion of the Related Art

A method of calculating similarity between gray scale images, which uses a normalized mutual correlation method, has previously been proposed. That method is robust with respect to alternating lighting conditions and is described in the text, Handbook of Image Analysis by Takagi et. al., Tokyo Univ. Publishing Association (Jan. 17, 1991).

FIG. 23 shows a prior art image processing apparatus which employs this method. The image processing apparatus of FIG. 23 is equipped with a camera 1 which inputs an image of objects, an A/D converter 2 which converts the inputted analog image to a digital image, an image memory 3 which stores the digital image, a D/A converter 4 which converts the digital image to an analog signal for displaying the image on a CRT-display 5, an address/data bus 6, a timing control unit 7, a CPU 8 which processes and controls the inputted image, the display, and the calculation of a similarity between inputted and model images, a memory 9 which stores image data for a similarity calculation, a similarity unit 10 for performing the similarity calculations, and a threshold decision unit 11.

The similarity unit 10 is equipped with a covariance unit 12, a normal deviation unit 13, a multiplication unit 14 and a division unit 15 as shown in FIG. 24.

The camera 1 receives an inputted image and outputs an analog image signal. The analog image signal is converted to a digital image signal by A/D converter 2, synchronized with a timing signal from the timing control unit 7. The converted digital image signal is stored in the image memory 3 as a gray scale image. The CRT-display 5 displays the inputted image which is stored in the image memory 3, after the inputted image is converted to an analog image signal by the D/A converter 4.

The similarity unit 10 calculates the similarity between the inputted image stored in the image memory 3, and a model (reference) image which is stored in the memory 9. The calculated similarity is also stored in the memory 9. The threshold decision unit 11 compares the calculated similarity stored in the memory 9 with a predetermined threshold value, and outputs OK or NG (good or no good) decision based on the comparison. The output OK/NG is also stored in the memory 9. Each functional unit shown in FIG. 23 communicates with other units via the address/data bus 6. The CPU 8 generates a start up command for each unit.

The similarity unit 10 calculates the similarity (CC) as follows:

$$CC = \frac{\sum_{x=0}^{mx-1}\sum_{y=0}^{my-1}\{I(x,y)-\bar{I}\}\{M(x,y)-\bar{M}\}}{\sqrt{\sum_{x=0}^{mx-1}\sum_{y=0}^{my-1}\{I(x,y)-\bar{I}\}^2}\sqrt{\sum_{x=0}^{mx-1}\sum_{y=0}^{my-1}\{M(x,y)-\bar{M}\}^2}}$$

where $$\bar{I} = \frac{1}{mx \times my}\sum_{x=0}^{mx-1}\sum_{y=0}^{my-1} I(x,y),$$

$$\bar{M} = \frac{1}{mx \times my}\sum_{x=0}^{mx-1}\sum_{y=0}^{my-1} M(x,y),$$

and a size of an inputted image and a model image is represented by (mx,my), a density of inputted image is represented by I(x,y), and a density of the model image is represented by M(x,y).

The density of the inputted image I(x,y) and the density of the model image M(x,y) are transmitted to the similarity unit 10. The covariance unit 12 calculates the covariance between I(x,y) and M(x,y) as follows:

$$\sum_{x=0}^{mx-1}\sum_{y=0}^{my-1}\{I(x,y)-\bar{I}\}\{M(x,y)-\bar{M}\}.$$

The normal deviation unit 13 calculates the normal deviation of I(x,y) as follows:

$$\sqrt{\sum_{x=0}^{mx-1}\sum_{y=0}^{my-1}\{I(x,y)-\bar{I}\}^2}.$$

The normal deviation unit 13 also calculates the normal deviation of M(x,y) as follows:

$$\sqrt{\sum_{x=0}^{mx-1}\sum_{y=0}^{my-1}\{M(x,y)-\bar{M}\}^2}.$$

The multiplication unit 14 multiplies the normal deviation of I(x,y) by the normal deviation of M(x,y) as follows:

$$\sqrt{\sum_{x=0}^{mx-1}\sum_{y=0}^{my-1}\{I(x,y)-\bar{I}\}^2}\sqrt{\sum_{x=0}^{mx-1}\sum_{y=0}^{my-1}\{M(x,y)-\bar{M}\}^2}.$$

The division unit 15 then calculates the normalized mutual correlation (CC). The calculated normalized mutual correlation (CC) is stored in the memory 9 as the measure of similarity between the inputted image and the model image.

The method of calculating the normalized mutual correlation does not change even if a density level and scaling change for the image. However, in the case of a non-linear relation of shading and a changed background between the inputted image and the model image, the existing FIGS. 23, 24 image processing apparatus cannot recognize a pattern stably. It is because the ratio of multiplication of each normal deviation to a covariance between model image and inputted image is so big that the measure of similarity becomes small. For example, the similarity between the inputted image, which has a background partly changed related to the background of the model image, and the model image is calculated to be a low similarity. Thus, even though with only a background shading change, for example, in one of the images, the image processing apparatus cannot recognize a pattern stably because with such a change the similarity is determined to be low.

SUMMARY OF THE INVENTION

The object of the present invention is a method and apparatus for calculating a similarity between an inputted image and a model or reference image, even if it must calculate a similarity between an inputted image whose background is partly changed from a model image, and the model image.

In order to achieve this object, an image processing method and apparatus of the invention calculates a similarity between two gray scale images by adding evaluated differences between edge directions of the two images. The edge direction of an image is defined as the gradient vector direction of the image. The edge direction value of an image does not change, even if the contrast between a background and an object image may be changed. The edge direction is calculated from a mask operator, so the background density is constant, even if the background is changed continuously. In the case of an object image drawn on a complicated background, when the background is discontinuously changed, the edge direction may sometimes be wrong, but the errors do not effect all of image, because the edge direction is calculated based on a limited part of the image. When the gray scale level of a background pattern (shading) is changed continuously or a complicated background pattern is discontinuous slightly, the edge direction image processing method and apparatus of the invention is still able to reliably recognize a mark or a character.

These and other objects, features and advantages of the invention will be more clearly understood from the following detailed description of the invention which is provided in connection with the accompanying drawings.

BRIEF DESCRIPTION OF THE DRAWINGS

FIG. 6(a) shows another model image;

FIG. 6(b) shows another inputted image;

FIG. 6(c) shows the edge direction data of the model image in FIG. 6(a);

FIG. 6(d) shows the edge magnitude data of the inputted image in FIG. 6(b);

FIG. 6(e) shows the edge magnitude data of the model image in FIG. 6(a);

FIG. 6(f) shows the difference of edge direction data between the inputted image and the model image;

FIG. 7(a) shows evaluating-values of the difference in FIG. 6(f), using a cosine function;

FIG. 7(b) shows other evaluating-values of the difference in FIG. 6(f), using the edge magnitude of the model image in FIG. 6(e);

FIG. 8(a) shows the model image data in FIG. 6(a);

FIG. 8(b) shows inputted image data whose background is partly shaded;

FIG. 20(a) shows model image data;

FIG. 20(b) shows edge magnitude data of the model image in FIG. 20(a);

FIG. 21(a) shows edge direction data of the model image in FIG. 20(a);

FIG. 21(b) shows inputted image data;

FIG. 21(c) shows edge direction data of the inputted image data in FIG. 21(b);

FIG. 22(a) shows the difference data between the edge direction data of the model image and the edge direction data of the inputted image;

FIG. 22(b) shows the FIG. 22(a) data multiplied by two (2);

FIG. 22(c) shows the cosine of the data in FIG. 22(c);

FIG. 25(a) shows a model image;

FIG. 25(b) shows an inputted image;

FIG. 25(c) shows a density scale for FIGS. 25(a) and 25(b);

FIGS. 28(a), 28(b) respectively show the edge direction and the edge magnitude of Image 0 in FIG. 27;

FIGS. 29(e), 29(f), 29(g), 29(h) show the respective edge magnitude of Images 1 to 4 in FIG. 27;

FIG. 37 shows a representative edge direction data;

FIG. 38 shows a representative edge magnitude data;

FIG. 39 shows other representative edge magnitude data; and

FIG. 40 shows other representative edge magnitude data.

DETAILED DESCRIPTION OF THE INVENTION

First Embodiment

Figure 1:
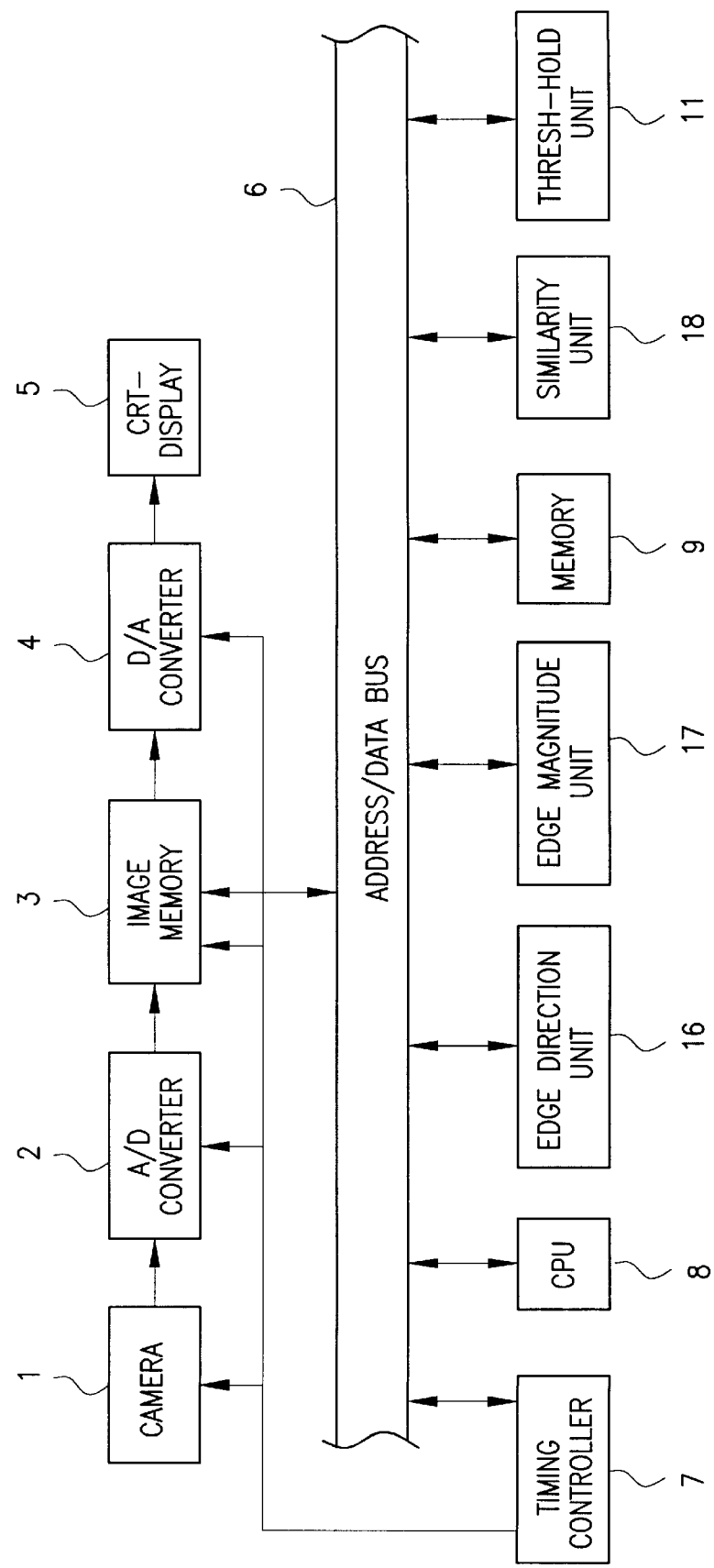
FIG. 1 is a schematic block diagram of the image processing apparatus of the invention.

FIG. 1 shows a schematic block diagram of a first embodiment of the image processing apparatus of the invention. The image processing apparatus is equipped with a camera 1, an A/D converter 2, an image memory 3, a D/A converter 4, a CRT-display 5, an address/data bus 6, a timing controller 7, a CPU 8, a memory 9, a threshold decision unit 11, an edge direction unit 16, an edge magnitude unit 17 and a similarity unit 18.

Figure 2:
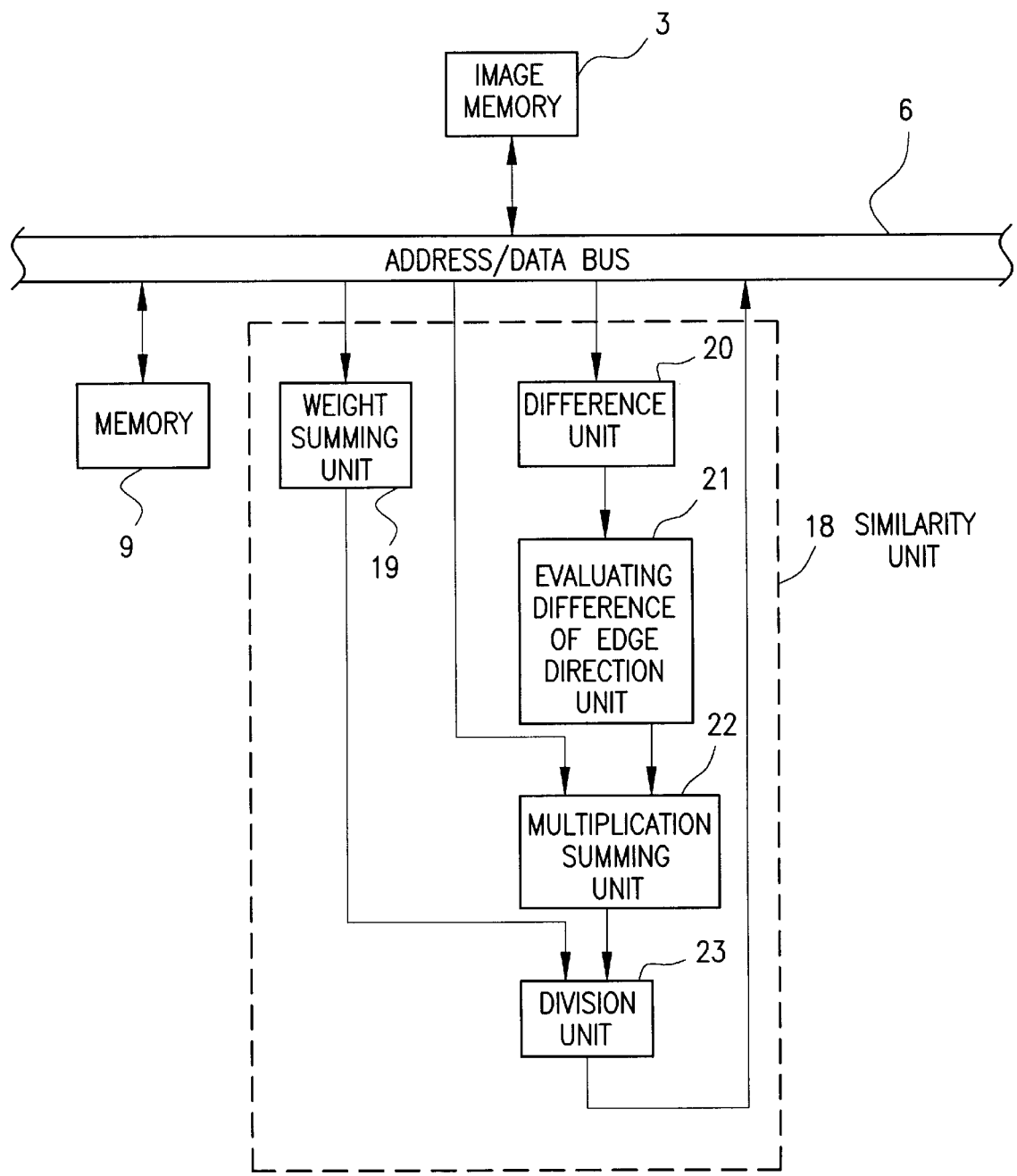
FIG. 2 is a schematic block diagram of the similarity unit of FIG. 1.

As shown in FIG. 2, the similarity unit 18 is equipped with a weight summing unit 19, a difference unit 20, an evaluating difference of edge direction unit 21, a multiplication summing unit 22, and a division unit 23.

Figure 4A:
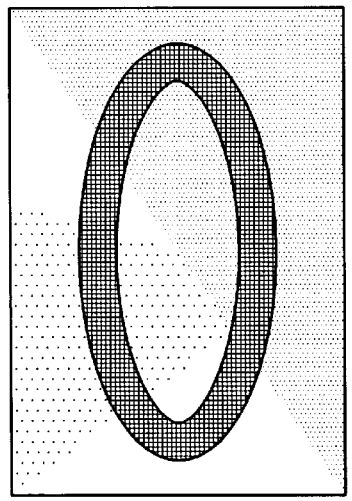
FIG. 4(a) shows an inputted image.
Figure 4B:
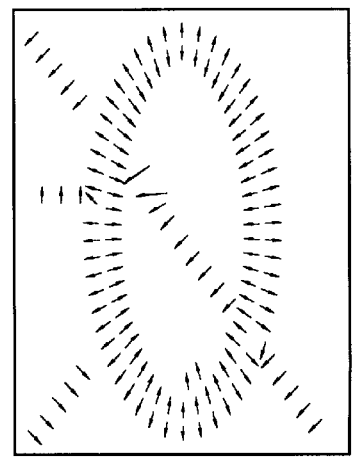
FIG. 4(b) shows the edge direction of the inputted image in FIG. 4(b)
Figure 5:
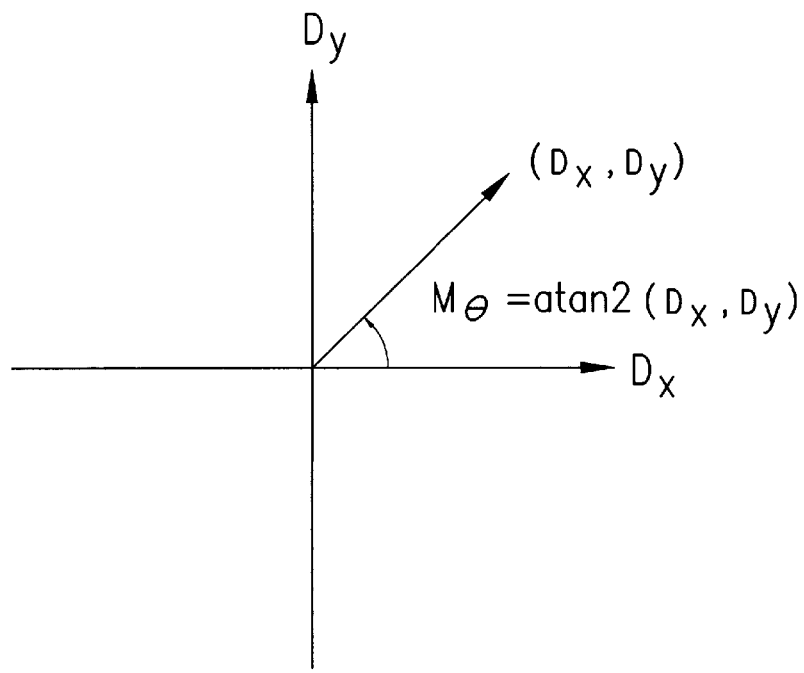
FIG. 5 shows a calculation of an edge direction of model image.

Referring to FIG. 1, an analog image signal which is outputted from the camera 1 is converted to a digital image signal by A/D converter 2 in synchronism with a timing signal from the timing controller 7. The converted digital image is stored in the image memory 3. The stored digital image is converted to an analog image by the D/A converter 4. After the D/A conversion, the CRT-display 5 displays an image. The digital image which is stored in the image memory 3, is converted to the edge direction inputted image by the edge direction unit 16. As shown in FIG. 4(b), the edge direction unit 16 sets gradient vectors which are essentially normal to the edges of an image edge. In other words, the gradient of an image g(x,y) at location (x,y) is defined as the two-dimensional vector:

$$G(x, y) = \left( \frac{\partial}{\partial x} f(x, y), \frac{\partial}{\partial y} f(x, y) \right),$$

and the edge direction D is defined by $$D = \tan^{-1}\left( \frac{\frac{\partial}{\partial y} g(x, y)}{\frac{\partial}{\partial x} g(x, y)} \right).$$

The edge magnitude unit 17 calculates an edge magnitude of an image, where the edge magnitude of the image is defined as the gradient vector magnitude of the image. In other words, the edge magnitude of an image $M_t(xy)$ at location (x,y) is defined by $$M_w(x, y) = \sqrt{\left( \frac{\partial}{\partial x} g(x, y) \right)^2 + \left( \frac{\partial}{\partial y} g(x, y) \right)^2}.$$

Figure 3C:
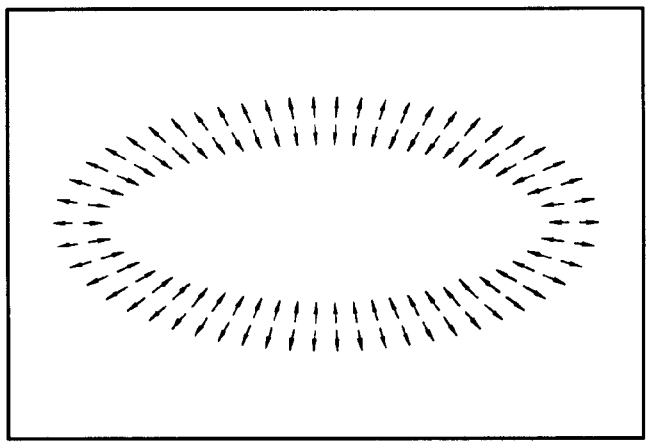
FIG. 3(c) shows the edge direction of the model image in FIG. 3(a)
Figure 3B:
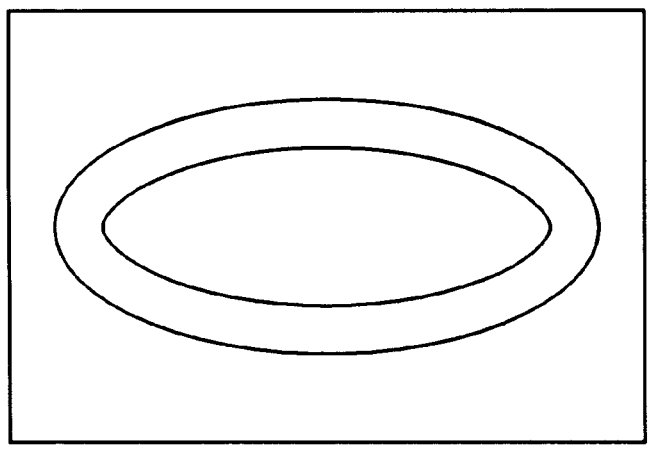
FIG. 3(b) shows the edge magnitude of the model image in FIG. 3(a)

The similarity unit 18 calculates a similarity, using the edge magnitude of the model image (FIG. 3(b)) stored in the memory 9, the edge direction of the model image (FIG. 3(c)) also stored in the memory 9, and the edge direction of the inputted image (FIG. 4(b))stored in the image memory 3, as described below. The calculated similarity is then stored in the memory 9. The threshold decision unit 11 compares the similarity stored in the memory 9 with a predetermined threshold, and outputs a signal that represents OK (good) or NG (no good). The result signal OK/NG is also stored in the memory 9. The address/data bus 6 communicates between the above-mentioned units. The CPU 8 generates a start up command for each unit.

The manner in which the similarity unit 18 calculates a similarity(R) between the inputted image and the model image using the edge direction and the magnitude of the model image and the edge direction of the inputted image is as follows:

$$R = \frac{\sum_{x=0}^{mx-1} \sum_{y=0}^{my-1} \{M_w(x, y) \cdot f(I_\theta(x, y) - M_\theta(x, y))\}}{\sum_{x=0}^{mx-1} \sum_{y=0}^{my-1} M_w(x, y)}.$$

where the edge direction length of the inputted image (mx,my) is defined by $$(mx, my) = \left( \left| \frac{\partial}{\partial x} f(x, y) \right|, \left| \frac{\partial}{\partial y} f(x, y) \right| \right),$$

the edge magnitude of the model image, that is, the weighting value for an evaluating function, is $M_w(x,y)$, the edge direction of the inputted image is $I_\theta(x,y)$, the evaluating function is $f(\omega)$, and the edge direction of the model image is $M_\theta(x,y)$.

Further, when an evaluating function $f(\omega)$ is denoted by the cosine of the difference between edge directions, the evaluating function $f(\omega)$ is defined as follows:

$f(\omega) = \cos(\omega)$, where $\omega = I_\theta(x,y) - M_\theta(x,y)$.

For example, the evaluating function $f(\omega)$ is also defined as follows:

$$f(\omega) = \begin{cases} 1 & \{(-45+360n)° \leq \omega \leq (45+360n)°\} \\ -1 & \{(135+360n)° \leq \omega \leq (225+360n)°\} \\ 0 & \{\text{others}\}, \end{cases}$$

where n is an integer.

The edge direction of inputted image $I_\theta(x,y)$ which is stored in the image memory 3, the edge magnitude of the model image $M_w(x,y)$, and the edge direction of the model image $M_\theta(x,y)$ are transmitted to the similarity unit 18 via the address/data bus 6. The weight summing unit 19 calculates a sum of edge magnitudes of the model image as follows:

$$\sum_{x=0}^{mx-1} \sum_{y=0}^{my-1} M_w(x,y).$$

The difference unit 20 calculates the difference between the edge direction of the inputted image and the edge direction of the model image as follows:

$I_\theta(x,y) - M_\theta(x,y)$.

The evaluating difference of edge direction unit 21 calculates the following:

$f(I_\theta(x,y) - M_\theta(x,y))$.

The multiplication summing unit 22 calculates the following:

$$\sum_{x=0}^{mx-1} \sum_{y=0}^{my-1} \{M_w(x,y) \cdot f(I_\theta(x,y) - M_\theta(x,y))\}.$$

Finally, the division unit 23 calculates the normalized similarity R as follows:

$$R = \frac{\sum_{x=0}^{mx-1} \sum_{y=0}^{my-1} \{M_w(x,y) \cdot f(I_\theta(x,y) - M_\theta(x,y))\}}{\sum_{x=0}^{mx-1} \sum_{y=0}^{my-1} M_w(x,y)}.$$

Figure 3A:
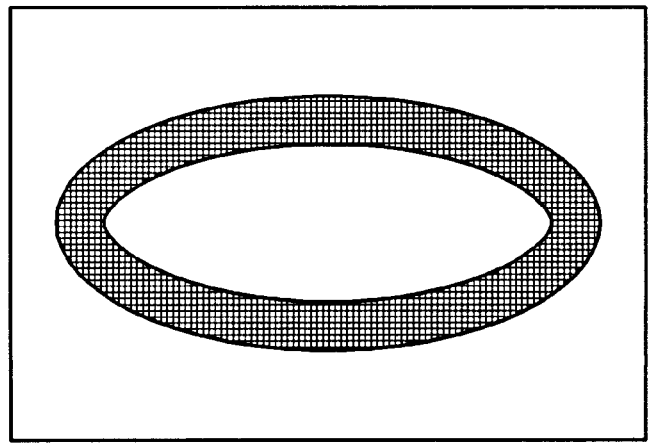
FIG. 3(a) shows a model image.

A model image is generated by the following procedures: a model image is placed before the camera 1 which outputs an analog image signal representing the model image. The outputted analog image signal is converted to a digital image signal by A/D converter 2. The converted digital image signal is stored in the image memory 3 (FIG. 3(*a*)). The model image is converted to the edge direction of the model image (FIG. 3(*b*)) by the edge direction unit 16. Further, the model image is converted to the edge magnitude of the model image (FIG. 3(*c*)) by the edge magnitude unit 17. The memory 9 stores the edge direction of the model image and the edge magnitude of the model image. The edge magnitude unit 17 calculates the edge magnitude as follows (using Sobel's operator):

$$M_w(x,y) = \sqrt{D_x(x,y)^2 + D_y(x,y)^2},$$

where $D_x(x,y) = M(x+1,y-1)+2M(x+1,y)+M(x+1,y+1)-M(x-1,y-1)-2M(x-1,y)-M(x-1,y-1)$, $D_y(x,y) = M(x+1,y+1)+2M(x,y-1)+M(x-1,y+1)-M(x+1,y-1)-2M(x,y-1)-M(x-1,y-1)$.

An edge direction unit 16 calculates edge direction as follows:

$$M_\theta(x,y) = \tan^{-1}\frac{D_y}{D_x}.$$

The edge direction may also be calculated using Prewtt's operator instead of Sobel's operator.

The present invention may be applied to the patterns shown in FIGS. 25(*a*) and 25(*b*) to determine a similarity. When the normalized mutual correlation method is used to determine a similarity between patterns 25(*a*) and 25(*b*), the results are not good. Both the inputted image 25(*b*) and the model image 25(*a*) are regarded as having a margin as shown FIGS. 6(*a*), (*b*) because both the edge magnitude and the edge direction is calculated from an operation of a matrix of 3×3 pixels. The edge direction of the model image and the edge direction of the inputted image are calculated from the edge direction unit 16. The calculating result of the edge direction is shown in FIGS. 6(*c*), (*d*). The edge magnitude of the model image is also calculated from the edge magnitude unit 17. The calculating result of the edge magnitude is shown in FIG. 6(*e*), where a label ND indicates a pixel of an unfixed direction because both $D_x$ and $D_y$ are 0, and an evaluating-value of the edge directions' difference is $f(\omega) = 0$. The difference of the edge direction between the inputted image and the model image is shown in FIG. 6(*f*). The calculating result from $f(\omega) = \cos\omega$ and the above parameters is shown in FIGS. 7(*a*), (*b*). These Figs. show a small similarity value where a density of the background is discontinuous, except at a part of the unfixed direction(ND). The evaluating-values of other parts are about 1 regardless of the contrast between the background part and the character part. If the evaluating-value is denoted by the summing weighted evaluating-values which are greater than a predetermined value(evaluating-value method 1), then the similarity is about 0.92. If the evaluating-value is denoted by the summed weighted evaluating-values over the summing the weights(evaluating-value method 2), then the similarity is about 0.94. By contrast, the similarity calculated from the normalized mutual correlation for images 6(*a*) and 6(*b*) is only about 0.61.

If the patterns have the shading shown in FIGS. 8*a*(model image) and 8*b*(inputted image), then the similarity calculated from the normalized mutual correlation is 0.91, whereas the similarity calculated using the evaluating-value method 1 is about 0.98, and the similarity calculated using evaluating-value method 2 is 1.0.

Second Embodiment

Figure 9:
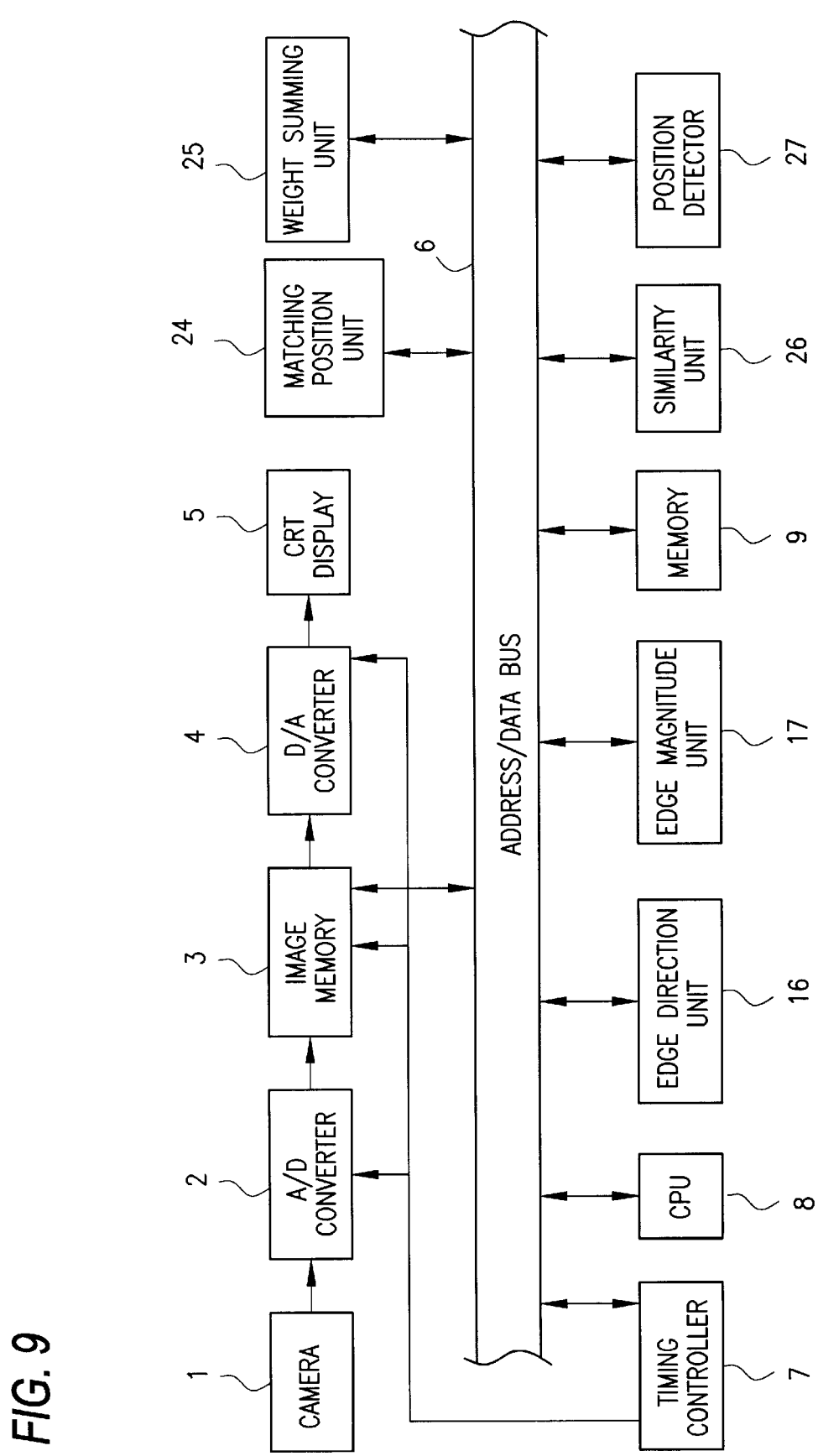
FIG. 9 is a schematic block diagram of a position detecting apparatus.

FIG. 9 shows a block diagram of a position detecting apparatus. The position detecting apparatus is equipped with units which have the same functions as like numbered units in FIG. 1, as well as a matching position unit 24, a weight summing unit 25, and a similarity unit 26 and a position detector 27, instead of the FIG. 1 threshold decision unit 11 and similarity unit 18.

Figure 10:
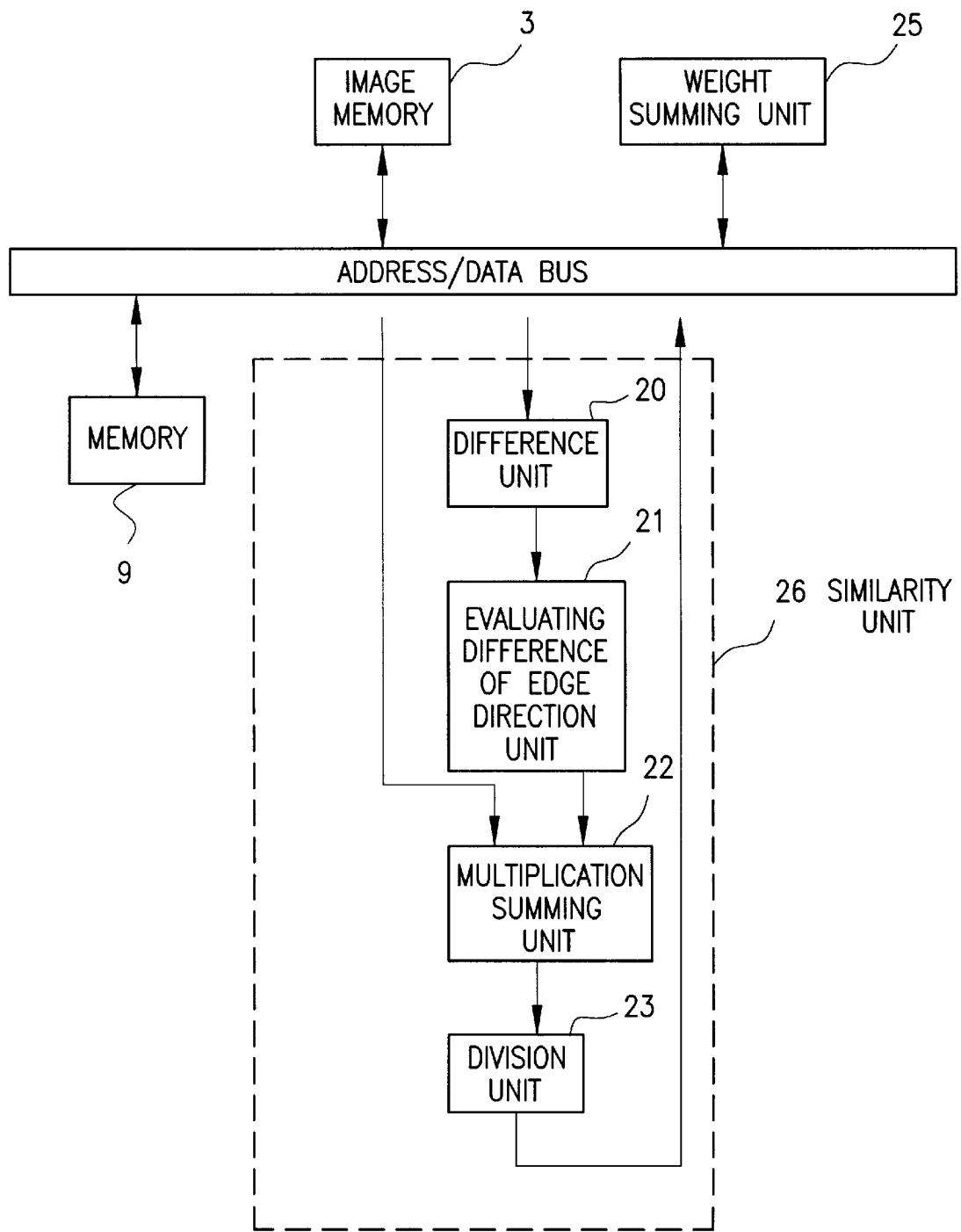
FIG. 10 is a schematic block diagram of the similarity unit of FIG. 9.

As shown in FIG. 10, the similarity unit 26 is equipped with a difference unit 20, an evaluating difference of edge direction unit 21, a summing multiplication unit 22, and a division unit 23. The summing weight, calculated at the weight summing unit 25, is applied to the division unit 23 via the address/data bus 6.

Figure 11C:
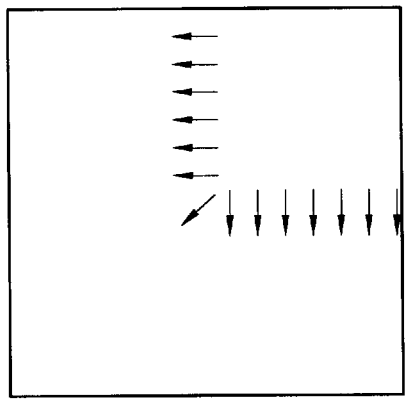
FIG. 11(c) shows the edge direction of the model image in FIG. 11(a)
Figure 11B:
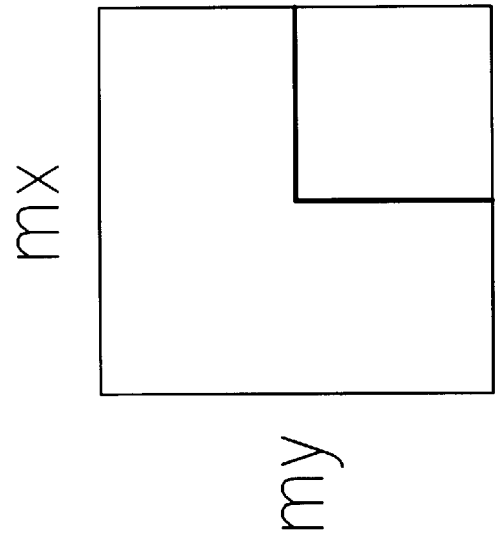
FIG. 11(b) shows the edge magnitude of the model image in FIG. 11(a)
Figure 11A:
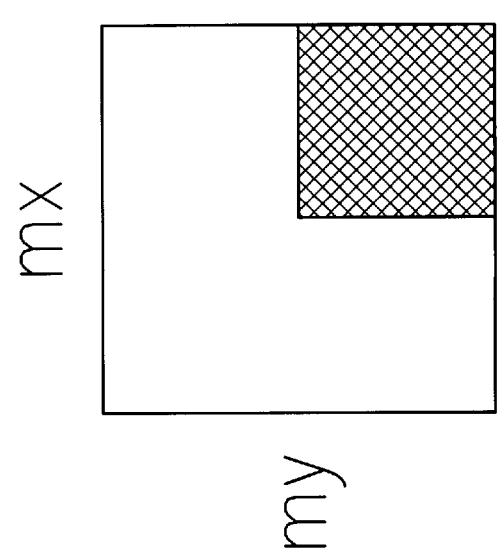
FIG. 11(a) shows another model image.
Figure 12A:
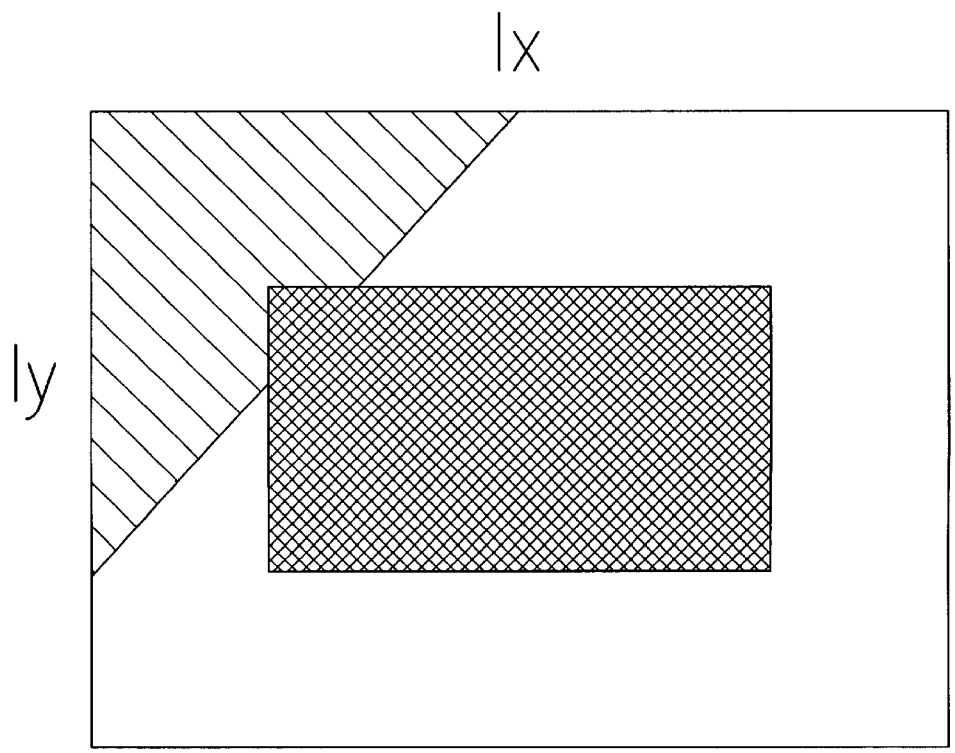
FIG. 12(a) shows other inputted image.
Figure 12B:
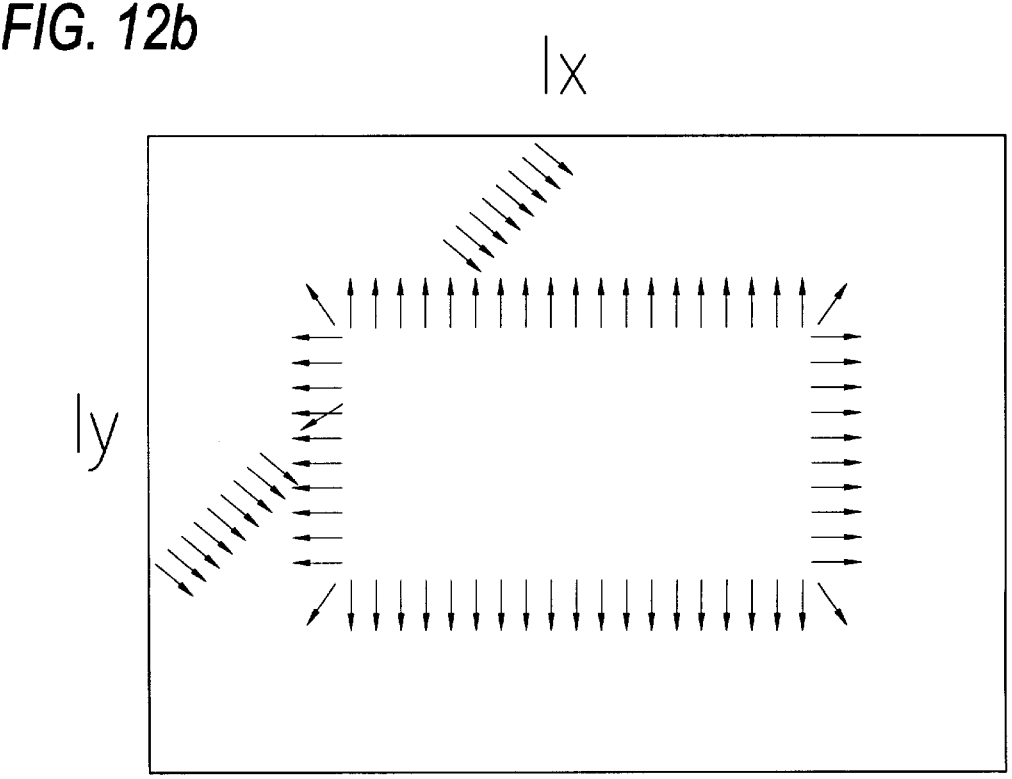
FIG. 12(b) shows the edge magnitude of the inputted image in FIG. 12(a)

An analog image signal which is outputted from the camera 1, is converted to a digital image signal by the A/D converter 2, synchronized with a timing signal from the timing controller 7. The converted digital image signal shown in FIG. 12(a) is stored in the image memory 3. The stored digital image signal is converted to an analog image signal by D/A converter 4. After the D/A conversion, the CRT-display 5 displays an image. The digital image, which is stored in the image memory 3, is converted to the edge direction image by the edge direction unit 16. The edge direction image is shown in FIG. 12(b). The matching position unit 24 calculates a matching position (i,j) (upper left basic coordinates of model image) between the model image (FIG. 11(a)) and the inputted image (FIG. 12(a)). The weight summing unit 25 calculates the evaluating-value of the difference between the edge direction of the inputted image (FIG. 11(c)) and the edge direction of the model image (FIG. 12(b)), weights the model edge magnitude (FIG. 11(b)) to the calculated evaluating-value, sums weighted evaluating-values at each pixel and outputs a similarity R(i,j) which is the sum of the weighted evaluating-values at each pixel. The outputted similarity and the matching position is stored in memory 9. The matching position unit 24 calculates a similarity at each possible matching position on the scanning region, changing the parameter of (i,j) in sequential order. If the matching position unit 24 detects an end of a scanning region, it shifts the calculating process to the position detector 27. The position detector 27 compares the maximum value of the similarity which is stored in memory 9 with a predetermined threshold value, and determines OK (good)/NG (no good). The result of OK/NG is stored in memory 9. If the result is OK, the position of maximum, that is, the matching position (imax, jmax) is stored in the memory 9. The address/data bus 6 communicates between the above-mentioned units. The CPU 8 generates a start up command for each unit.

Figure 13:
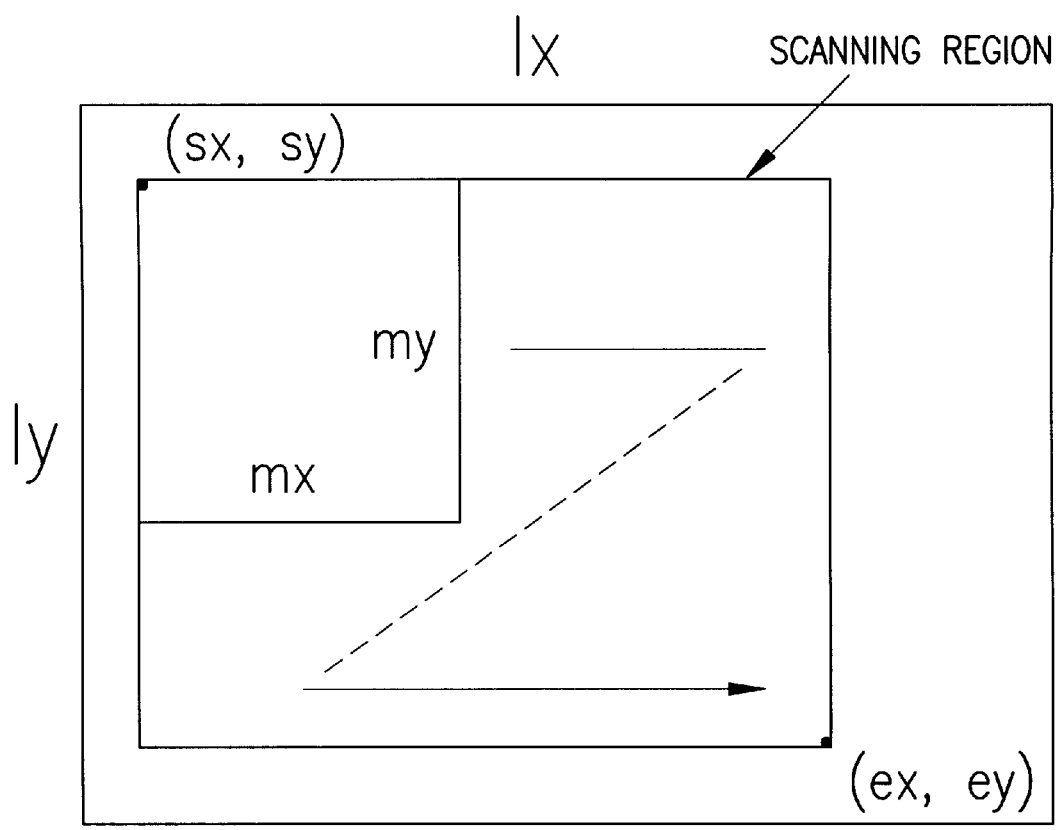
FIG. 13 shows a scanning region of an inputted image.
Figure 14:
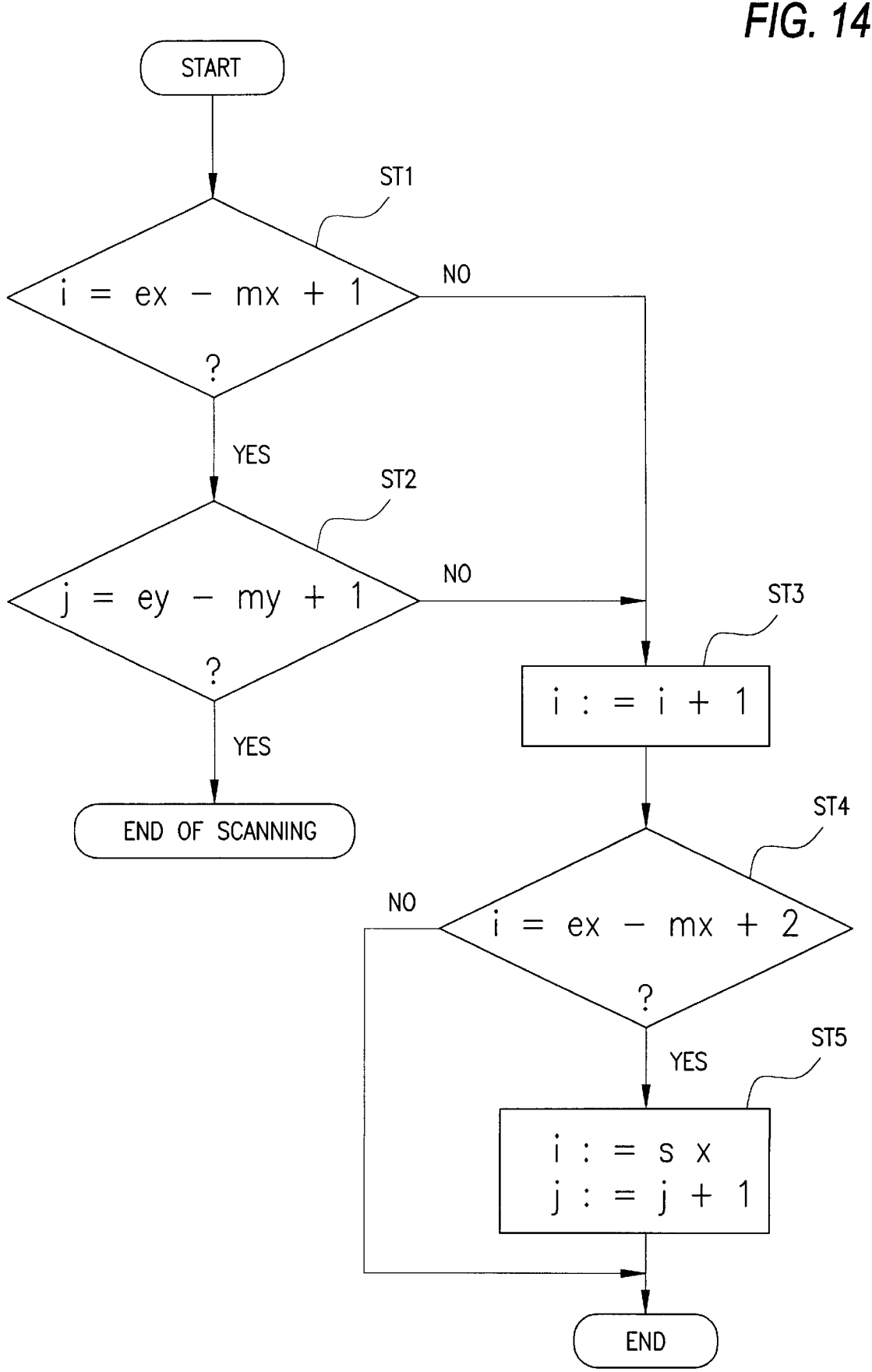
FIG. 14 is a flow chart for a calculating a matching position.

FIG. 14 shows the flow chart of the matching position unit 24. The predetermined scanning region as shown in FIG. 13, is defined by (sx,sy)–(ex,ey). The initial value is given by (i,j)=(sx−1,sy). The matching position unit scans the model image from upper left to lower right within the scanning region, and determines the matching position between the inputted image and the model image. When the matching position unit calculates down to the lower right corner (ex,ey), the position detector 27 outputs an end of scanning.

The similarity unit 26 calculates the similarity R(i,j) of the inputted image to the model image at the matching position (i,j) as follows:

$$R(i, j) = \frac{\sum_{x=0}^{mx-1} \sum_{y=o}^{my-1} \{M_w(x, y) \cdot f(I_\theta(i+x, j+y) - M_\theta(x, y))\}}{\sum_{x=o}^{mx-1} \sum_{y=0}^{my-1} M_w(x, y)},$$

where $M_w(x,y)$ is the edge magnitude of the model image, that is the weighting value for a evaluating function, $f(\omega)$ is the evaluating function, $I_\theta(i+x,j+y)$ is the edge direction of the inputted image at a pixel of (i+x,j+y), $M_\theta(i+x,j+y)$ is the edge direction of the model image at a pixel of (i+x,j+y) where the above expression is calculated using the same procedures as the first embodiment.

Third Embodiment

Figure 15:
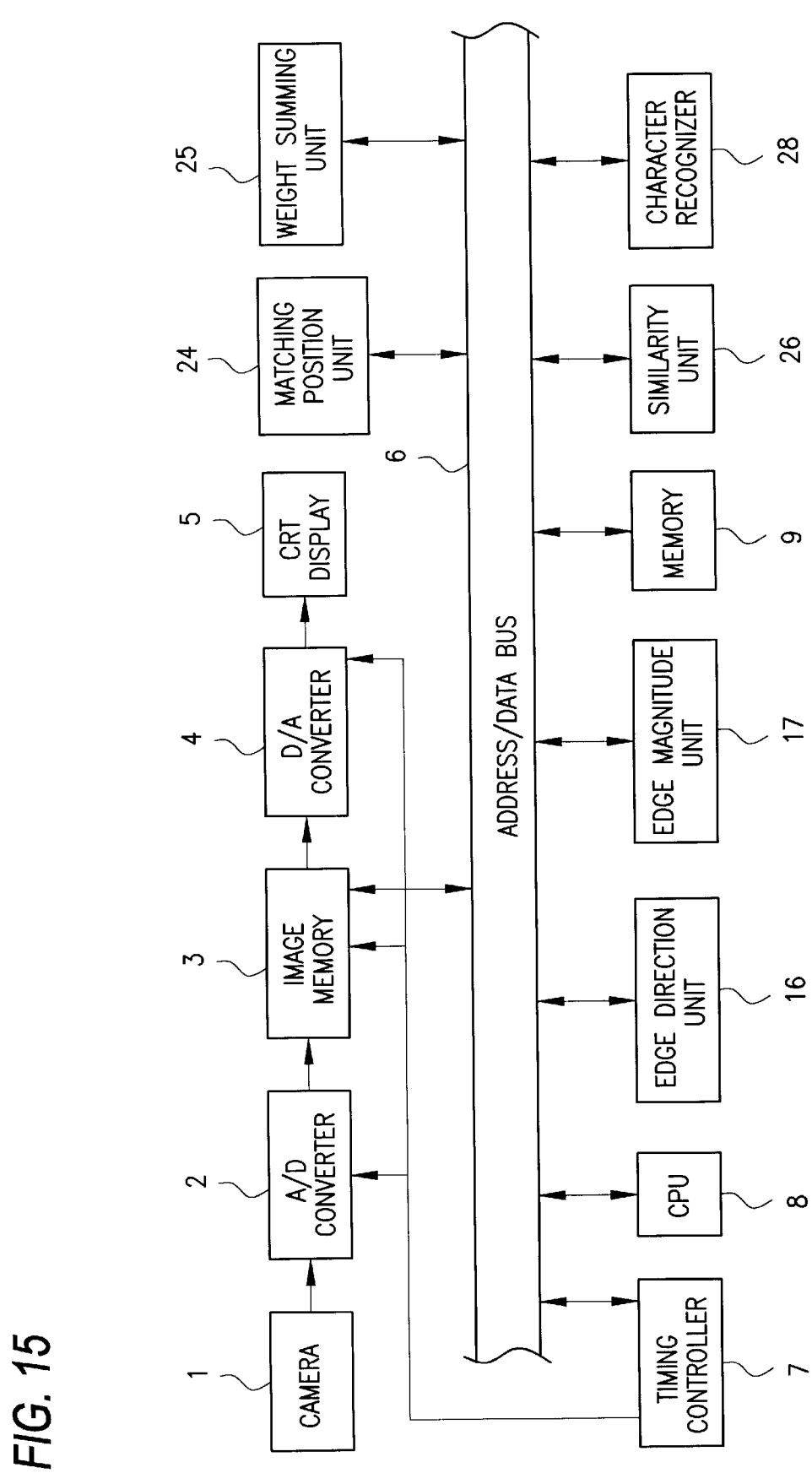
FIG. 15 is a schematic block diagram of an embossed character reading apparatus.

FIG. 15 is a schematic block diagram of an embossed character reading apparatus. The embossed character reading apparatus is almost the same as the position detecting apparatus. It is equipped with the same numbered units as in the prior embodiment; moreover, a character recognizer 28 is employed instead of the position detector 27.

Figure 17A:
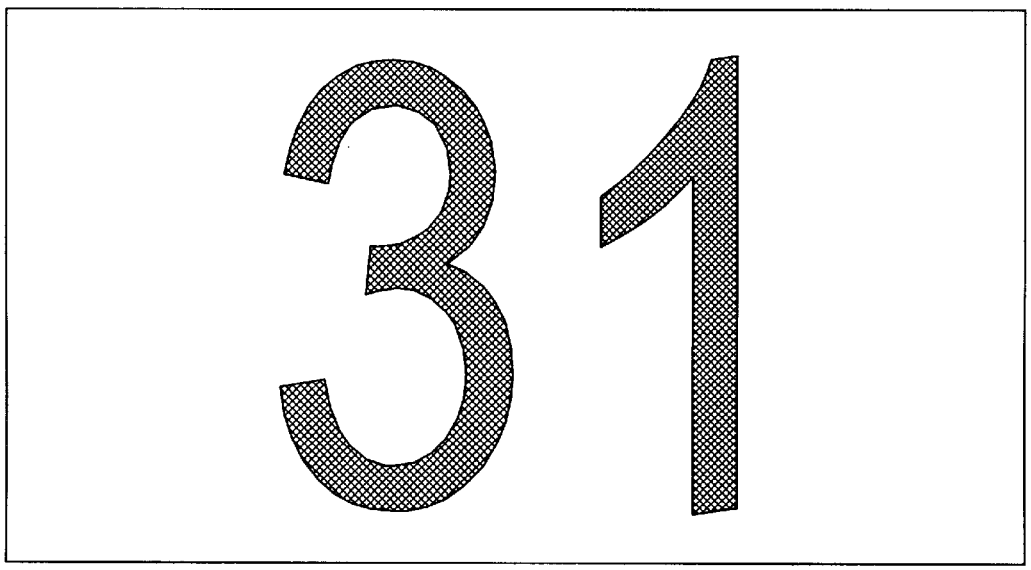
FIG. 17(a) shows an inputted image stored in image memory.
Figure 17B:
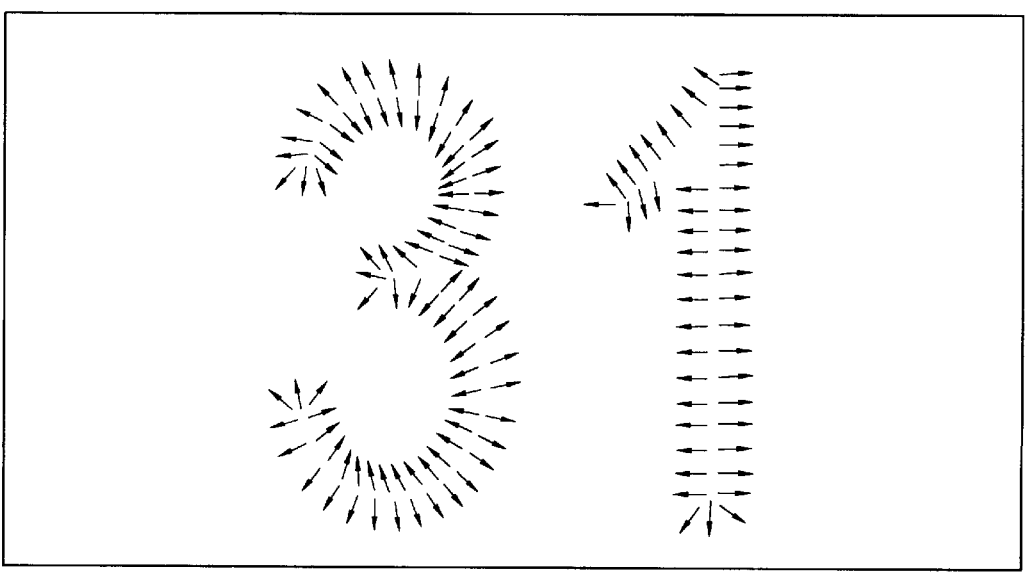
FIG. 17(b) shows the edge direction of the inputted image in FIG. 17(a)

An analog image signal which is outputted from the camera 1 is converted to a digital image signal by A/D converter 2, synchronized with a timing signal from the timing controller 7. The converted digital image signal shown in FIG. 17(a) is stored in the image memory 3. The stored digital image signal is converted to an analog image signal by the D/A converter 4. After the D/A conversion, the CRT-display 5 displays an image. The digital image which is stored in the image memory 3, is converted to an inputted edge direction (FIG. 17(b)) by the edge direction unit 16. The matching position unit 24 calculates a matching position (i,j)(upper left basic coordinates of model image) between the model image and the inputted image.

Figure 16A:
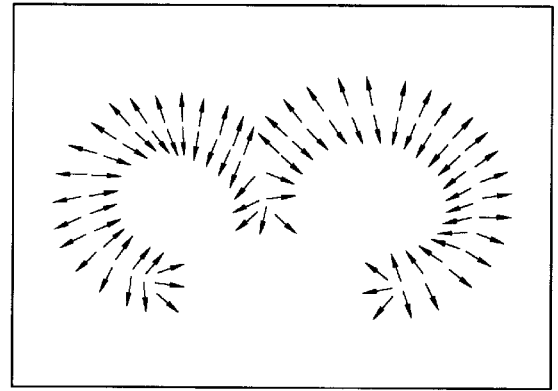
FIG. 16(a) shows a model image of an embossed character.
Figure 16B:
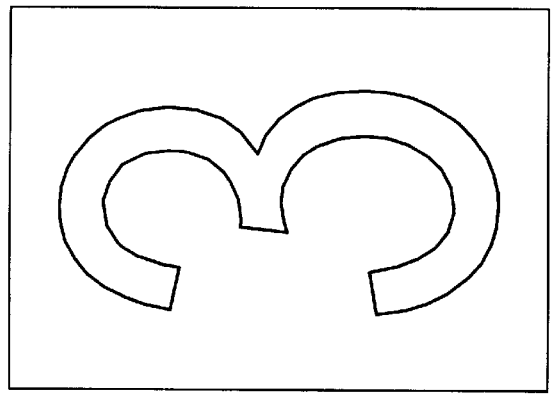
FIG. 16(b) shows the edge magnitude of the model image in FIG. 16(a)
Figure 16C:
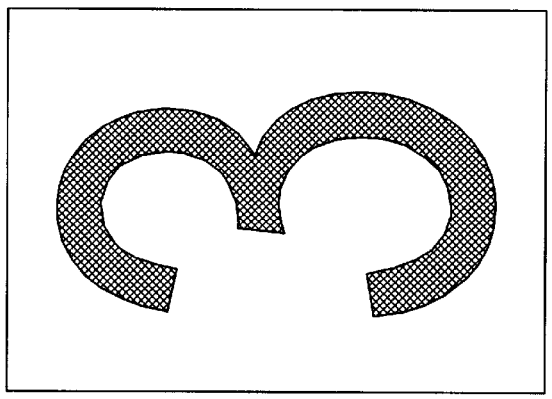
FIG. 16(c) shows the edge direction of the model image in FIG. 16(b)

In advance, the edge magnitude unit 17 calculates the edge magnitude of each character (FIG. 16(a)) of the model image (FIG. 16(b)) and the edge direction unit 16 calculates the edge direction of the model image (FIG. 16(c)), in each character. Both the edge magnitude and the edge direction of the model image are stored in the memory 9. The weight summing unit 25 sums the model edge magnitudes for every character. The calculated sum is stored in the memory 9. The similarity unit 26 calculates the similarity R(i,j,model) from the edge magnitude of the model image (FIG. 16(b)), the edge direction of the model (FIG. 16(c)) and the sum of the edge magnitude of the model. The calculated similarity R(i,j,model), the matching position (i,j) and the model name are stored in memory 9. Changing the value of (i,j) in sequential order, the similarity unit 26 calculates similarities at each possible matching position. The above procedures are applied to all read characters.

The character recognizer 28 recognizes characters, using the similarities which are stored in memory 9. The maximum similarity model among similarities with respect to all model images is set to the "model-max." If the similarity R(i,j,model-max) is greater than the predetermined threshold value which is stored in the memory 9, the character reader 28 detects a character similar to the model character (model-max) at the position (i,j). The detected character and the detected position are stored in the memory 9. This procedure is applied to the all possible positions (i,j).

The address/data bus 6 communicates between units. The CPU 8 generates a start up command for each unit. The matching position calculating procedure is the same as in the second embodiment.

The similarity unit 26 calculates the similarity R(i,j, model) at matching position (i,j) of a model (model) as follows:

$$R(i, j, model) = \frac{\sum_{x=0}^{mx-1}\sum_{y=o}^{my-1}\{M_{w,model}(x, y) \cdot f(I_\theta(i + x, j + y) - M_{\theta,model}(x, y))\}}{\sum_{x=o}^{mx-1}\sum_{y=0}^{my-1} M_{w,model}(x, y)},$$

where $M_{w,model}(x,y)$ is the edge magnitude of the model image, that is, weighting value for a evaluating function, $f(\omega)$ is the evaluating function, $I_\theta(i+x,j+y)$ is the edge direction of the inputted image at a pixel of (i+x,j+y), $M_{\theta,model}(i+x,j+y)$ is the edge direction of the model image at a pixel (i+x,j+y), and the calculating procedure is the same as the first embodiment.

Figure 18A:
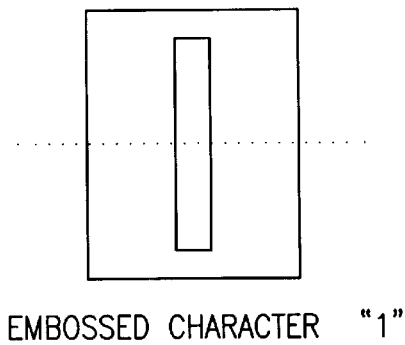
FIG. 18(a) shows an embossed character.
Figure 18B:
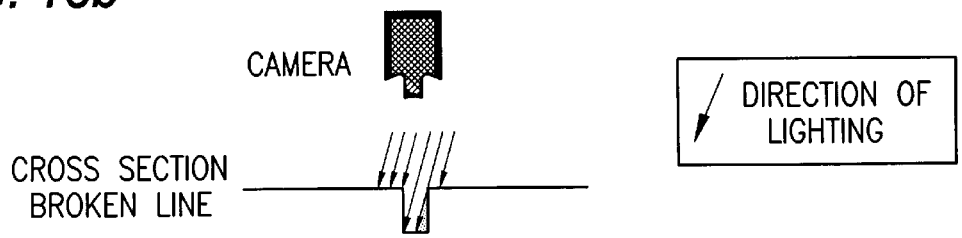
FIG. 18(b) shows the cross section of the embossed character which is lighted from the right direction.
Figure 18C:
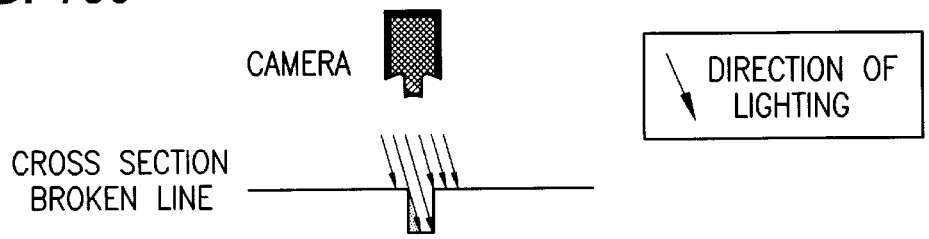
FIG. 18(c) shows the cross section of the embossed character which is lighted from the left direction.
Figure 18D:
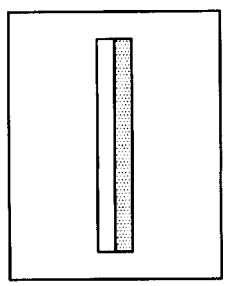
FIG. 18(d) shows the inputted image which is lighted from the right direction.
Figure 18E:
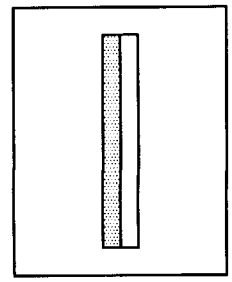
FIG. 18(e) shows the inputted image which is lighted from the left direction.
Figure 19A:
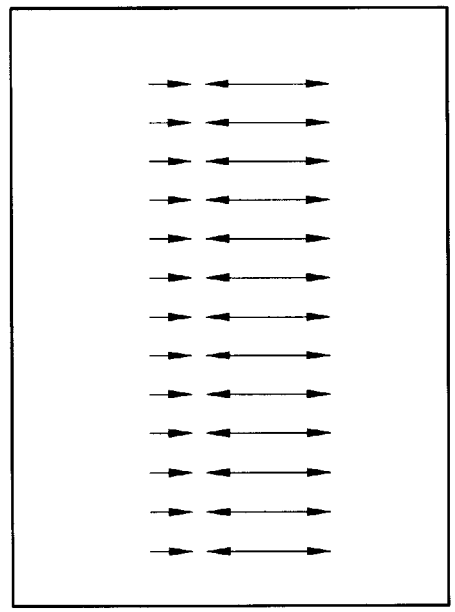
FIG. 19(a) shows the edge direction of the inputted image which is lighted from the right direction;12
Figure 19B:
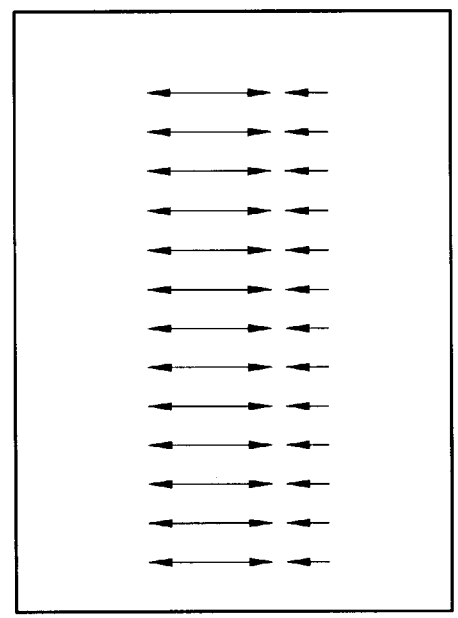
FIG. 19(b) shows the edge direction of the inputted image which is lighted from the left direction.
Figure 23:
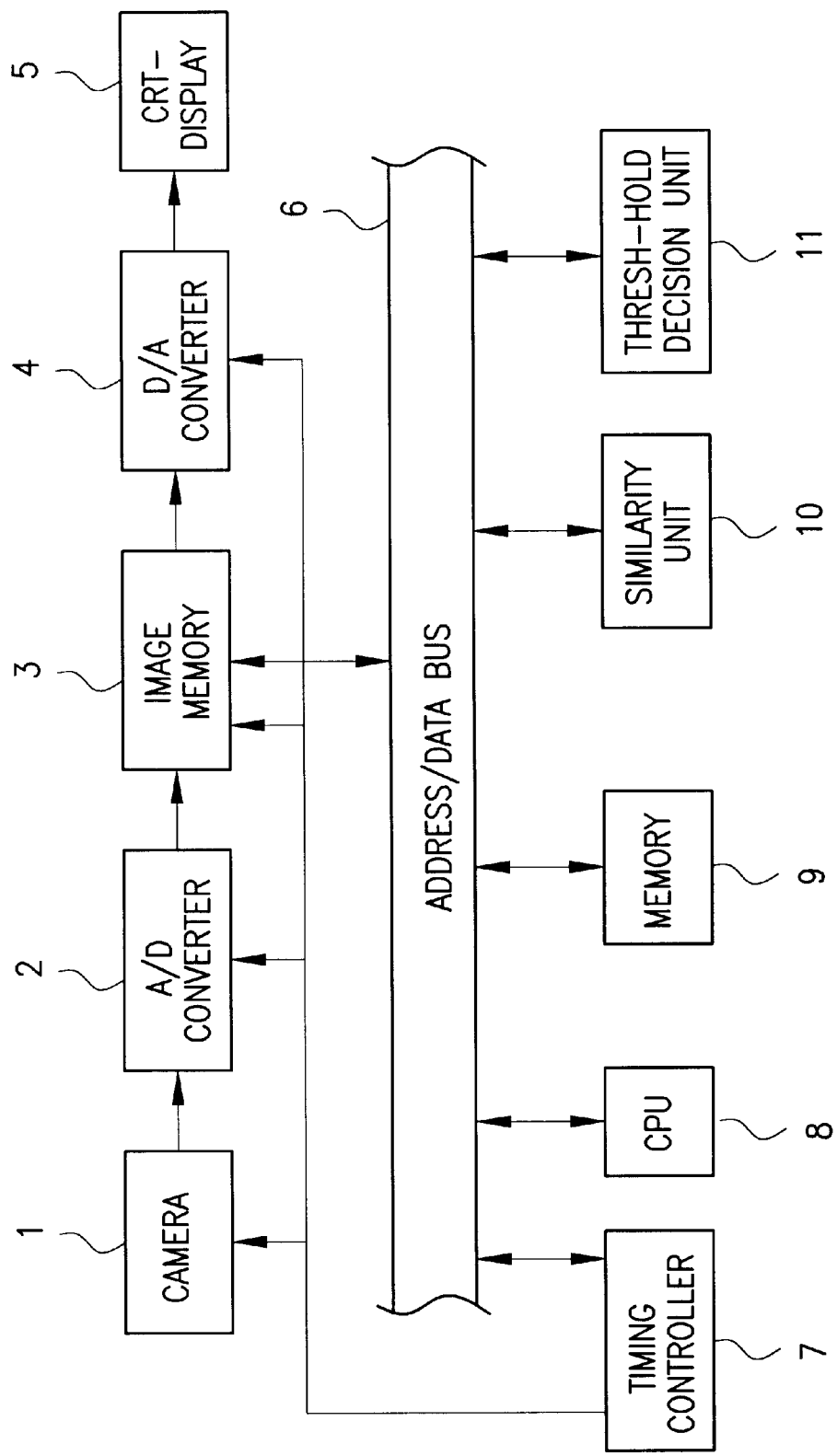
FIG. 23 is a schematic block diagram of a prior art image processing apparatus.
Figure 24:
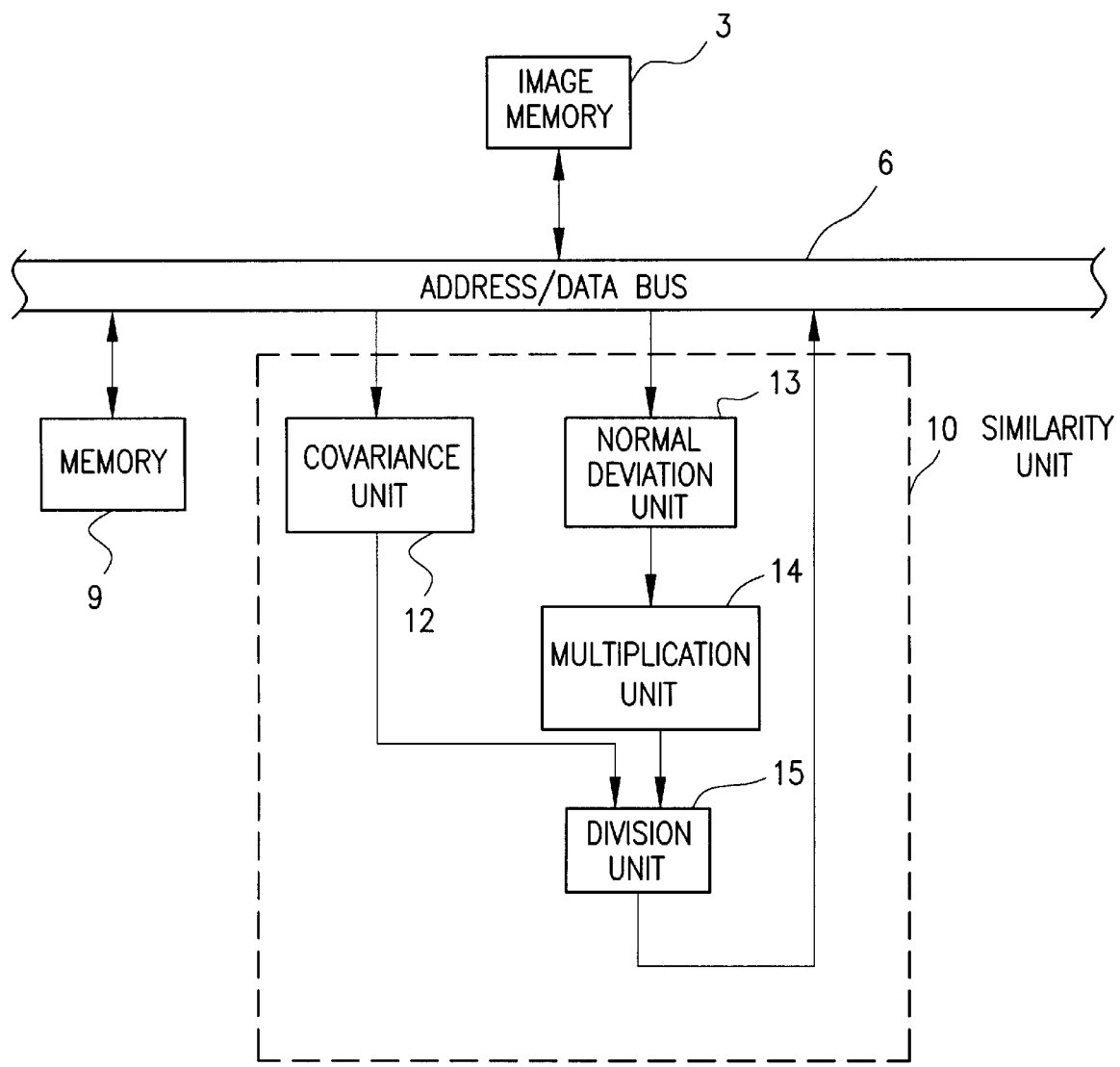
FIG. 24 shows a prior art similarity unit.

In the case of embossed character, there is much possibility to shift 180° about the edge direction even though the embossed character is in the same position, in accordance with a direction of a light (FIGS. 19(a), (b)). Because the direction of the light makes a shadow's position change (FIGS. 18(b), (c)), a viewing image changes (FIGS. 18(d), (e)). To adapt to the change of the viewing image, when the function of similarity $f(\omega)$ is set to $f(\omega)=\cos(2\omega)$, even if the edge direction is shifted 180°, $f(\omega)=1$. The edge direction shifted 180° is regard as the same to the edge direction not-shifted, that is, $f(\theta)=f(\theta+180°)$.

For example, if the image processing apparatus calculates the similarity between the model image (FIG. 20(a)) and the inputted image whose lighting direction is changed from that of the model image (FIG. 21(b)), the angular difference of edge direction between the model image (FIG. 20(c)) and the inputted image (FIG. 20(e)) is 180° (FIG. 22(a)) in accordance with the lighting direction. Therefore, if the evaluating function is set to $f(\omega)=\cos(2\omega)$, the value of $f(\omega)$ is 1.0 (FIG. 22(c)). This shows no decline about the similarity value. On the other hand, in accordance with the previously proposed normalized mutual correlation method, the similarity between model image (FIG. 20(a)) and inputted image (FIG. 21(b)) is −0.84.

Fourth Embodiment

As shown in FIGS. 1–25, the image processing apparatus and the position detecting apparatus take marks and characters which are clearly drawn on plain surface of a object, and registers the model of the edge direction and the edge magnitude on each pixel.

Figure 26:
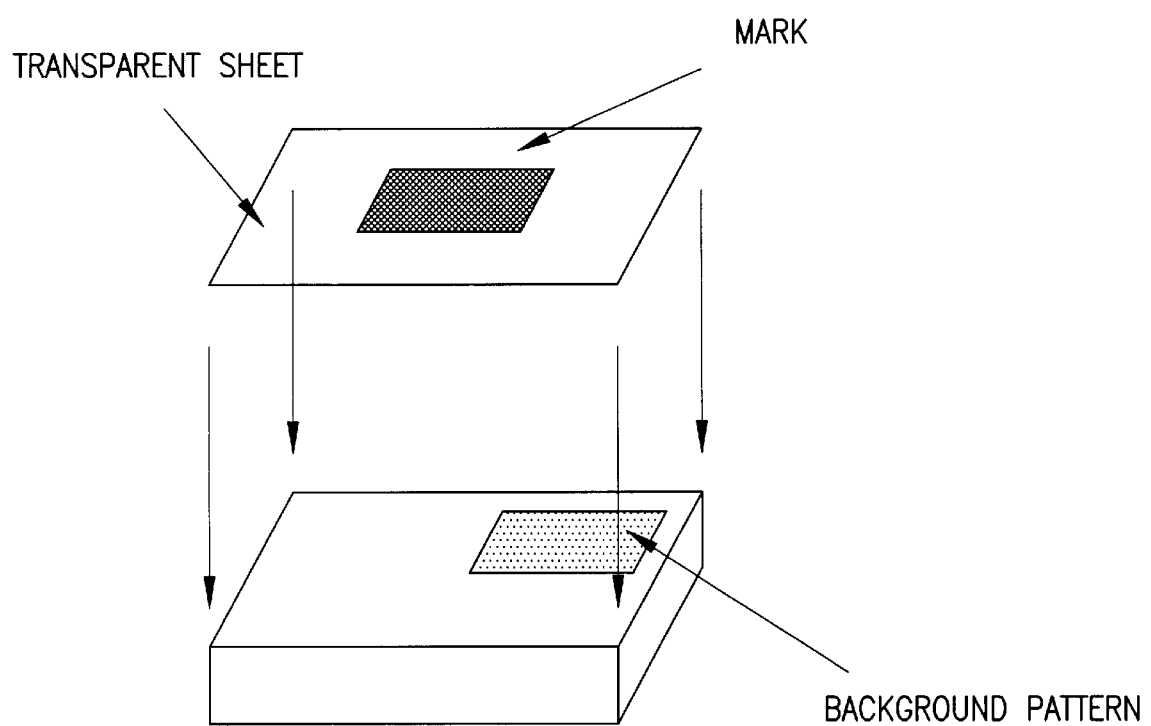
FIG. 26 shows a mark-printed transparent sheet on a object which has a background pattern.
Figure 27A:
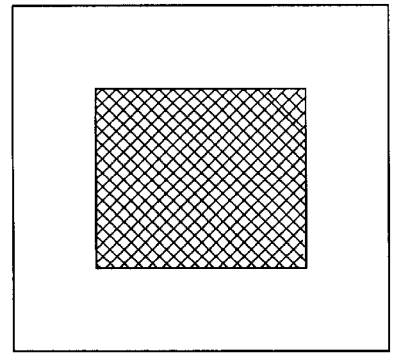
FIGS. 27(a), 27(b), 27(c), 27(d), 27(e) show respective images of an object which includes Images numbered from 0 to 4.
Figure 27E:
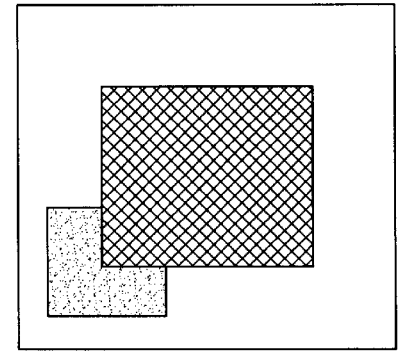
Figure 27D:
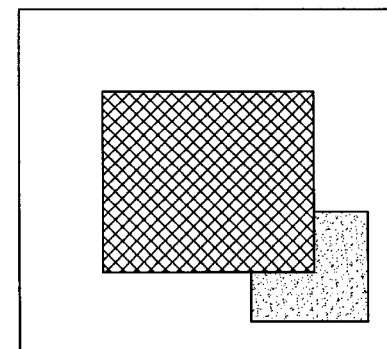
Figure 27C:
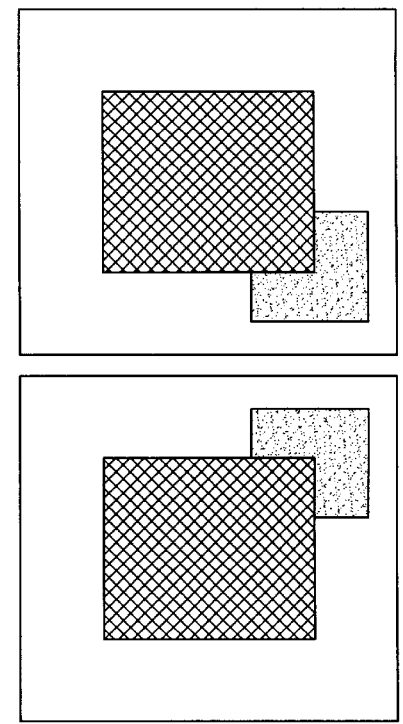
Figure 27B:
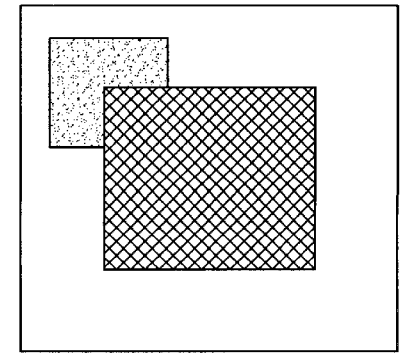
Figure 28A:
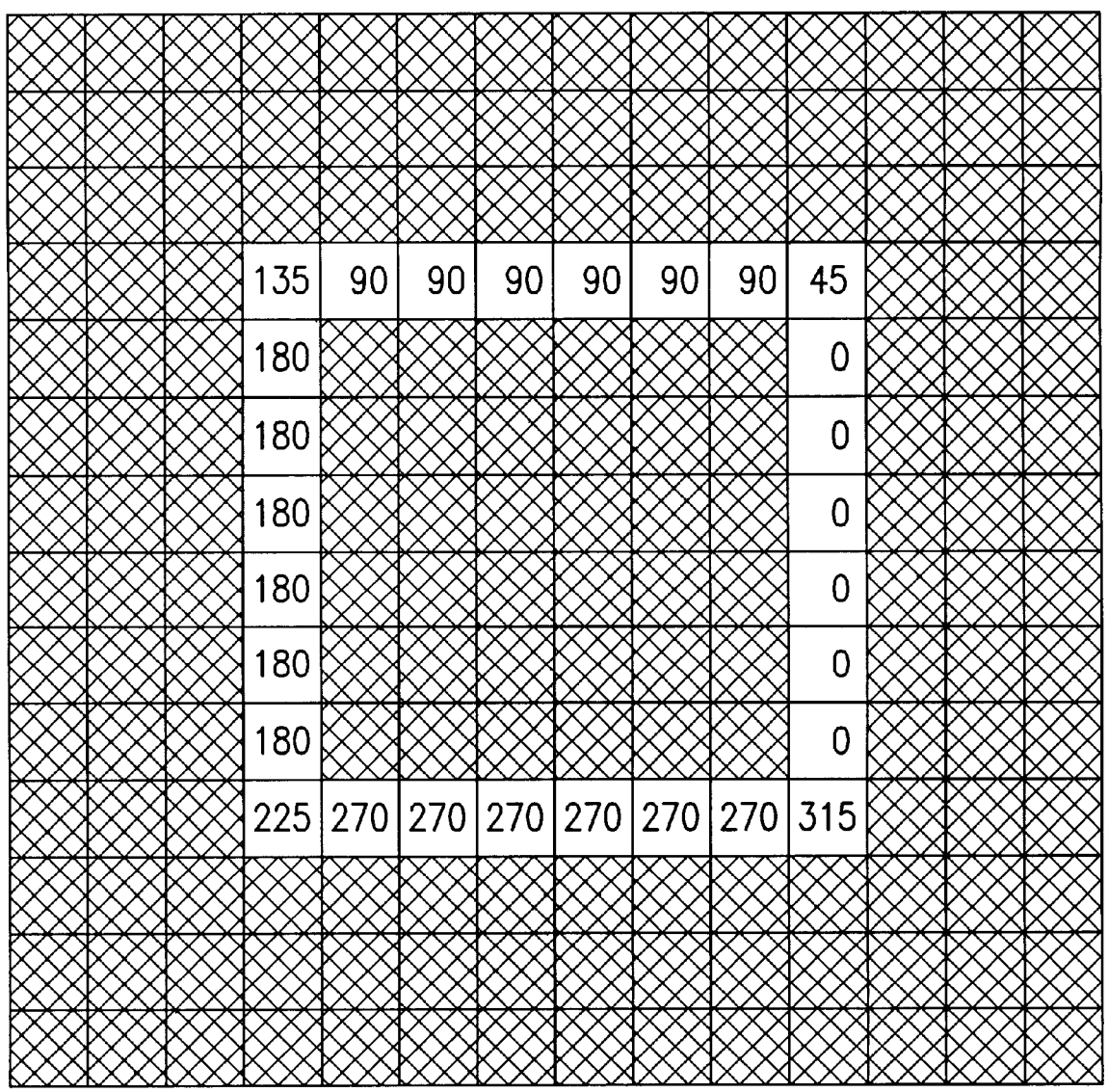
Figure 29A:
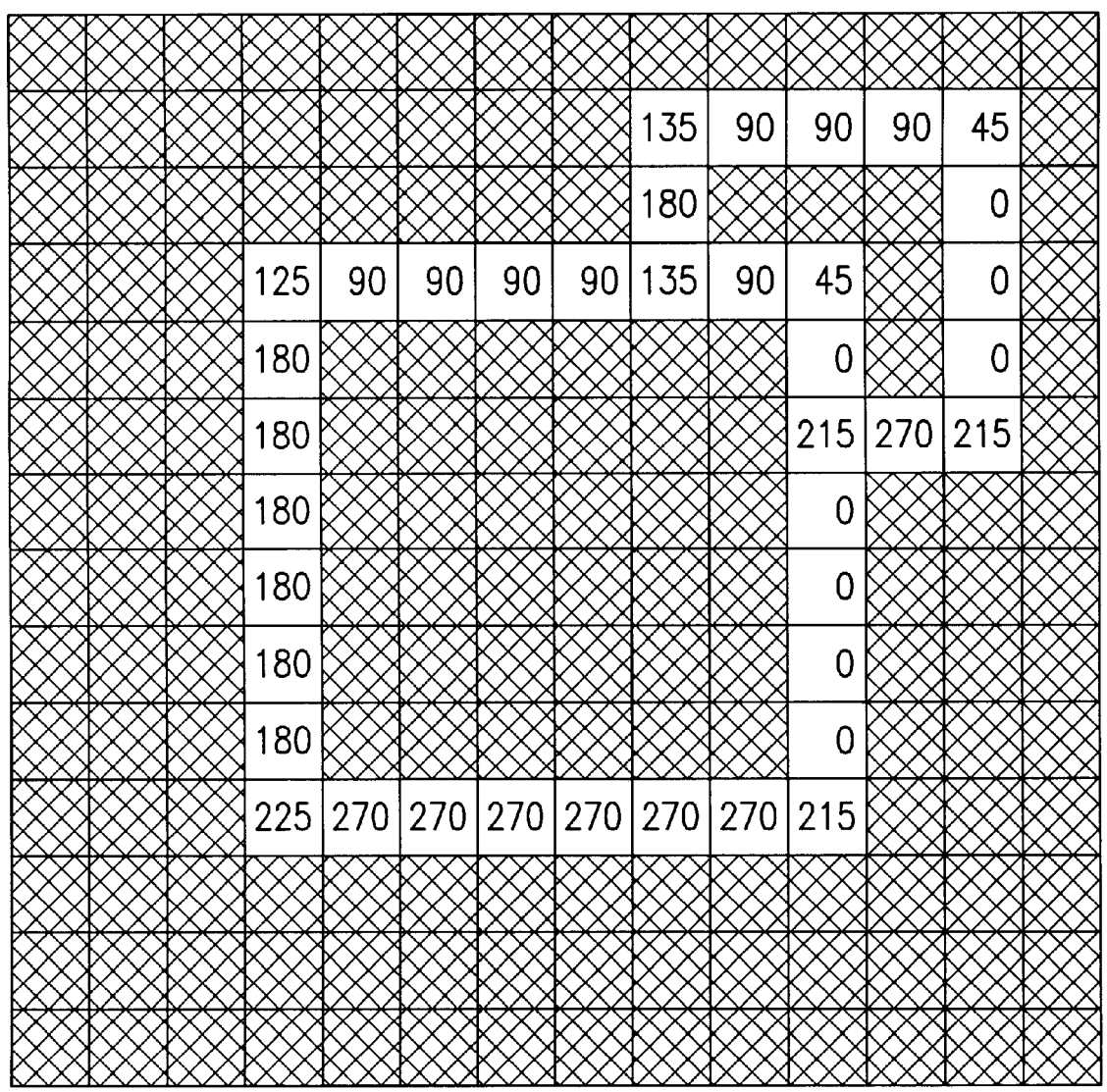
FIGS. 29(a), 29(b), 29(c), 29(d) show the respective edge direction of Images 1 to 4 in FIG. 27.
Figure 29B:
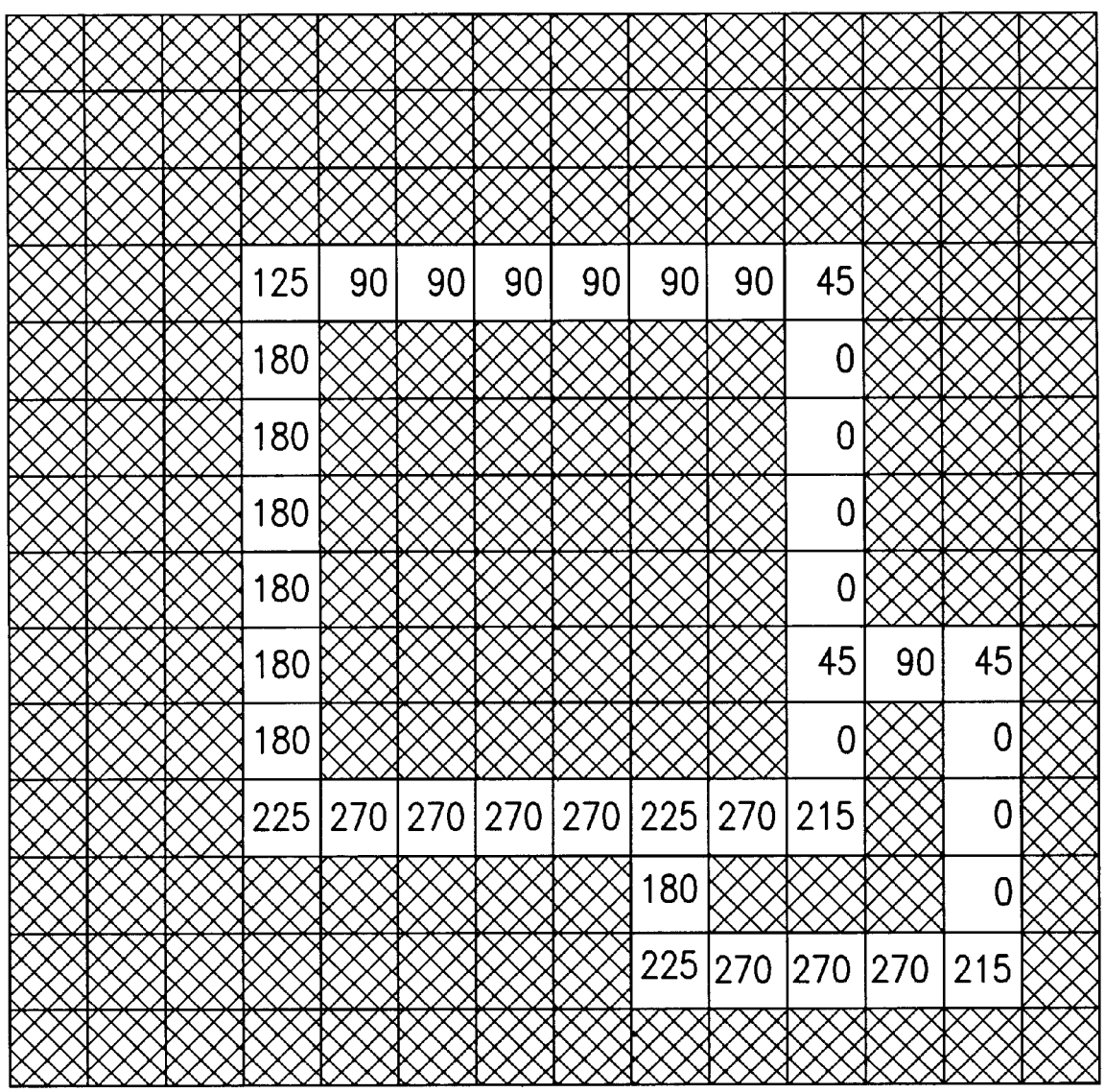
Figure 29C:
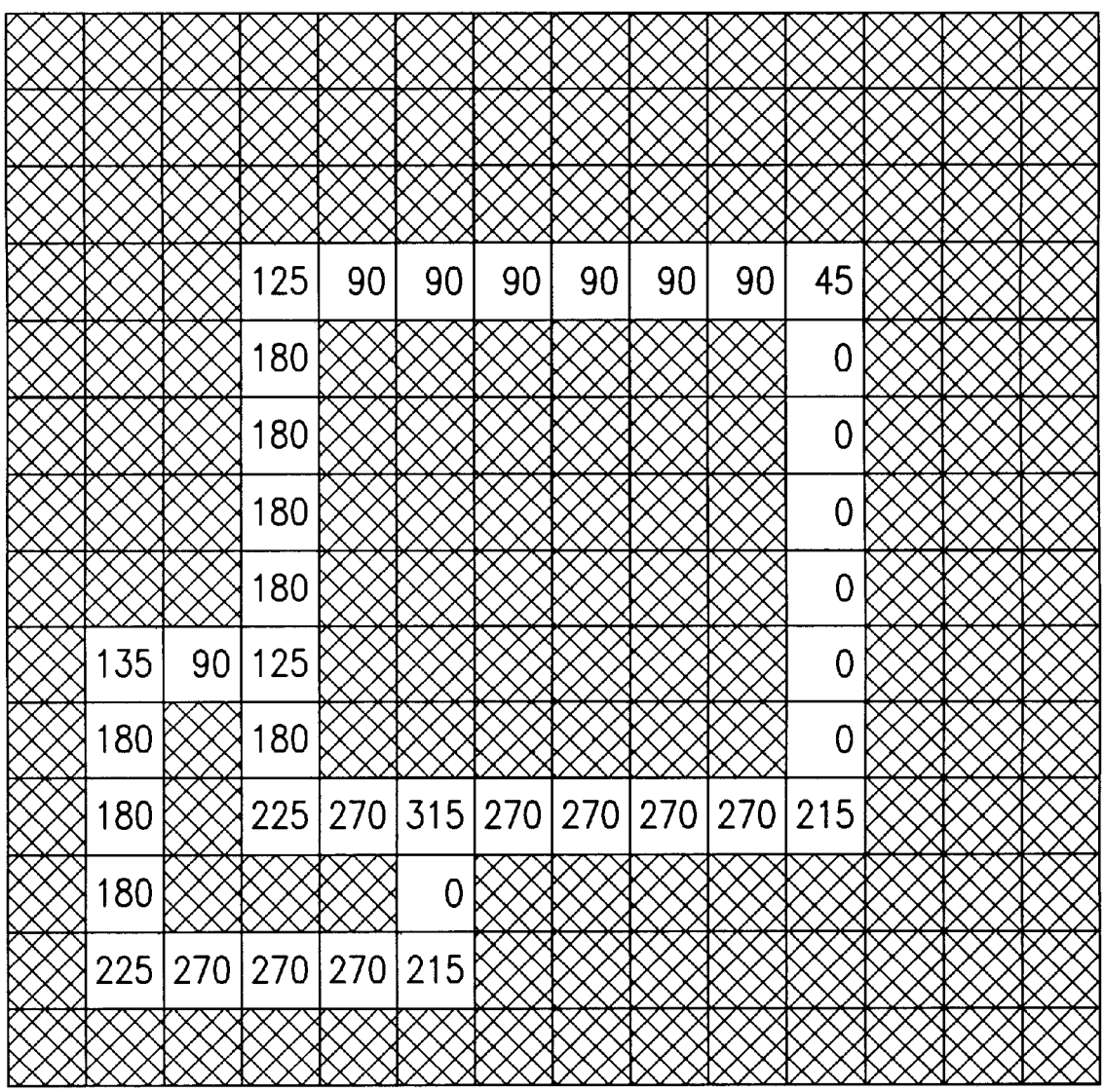
Figure 29D:
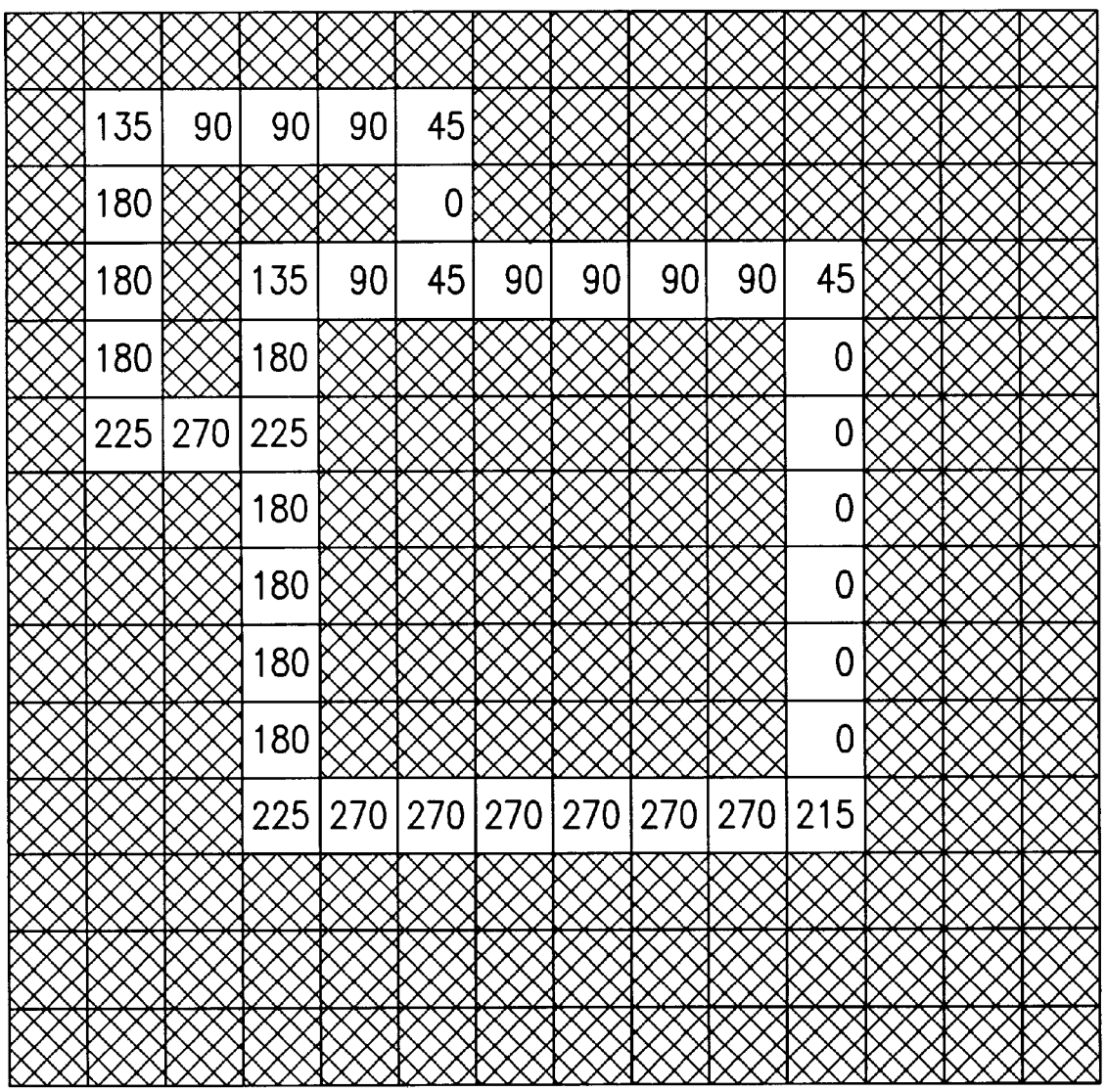

In the example of the present invention, FIG. 26 shows a mark-printed transparent sheet on a object which has a background pattern. The above sheet may be of any position on the above object. An image of a object is shown in FIG. 27, which includes Image 0–4. Image 0 shows a mark on a plain surface. The edge direction and edge magnitude of each image, is shown in FIGS. 28, 29. A black opaque means an unfixed direction in edge direction shown in FIGS. 28, 29.

The similarity function is defined as follows:

$$R = \frac{\sum_{x=0}^{mx-1}\sum_{y=0}^{my-1}\{M_w(x, y) \cdot f(I_\theta(x, y) - M_\theta(x, y))\}}{\sum_{x=0}^{mx-1}\sum_{y=0}^{my-1} M_w(x, y)}$$

where a length of the edge direction of the model image, the edge magnitude of the model image and the edge direction of the inputted image are set to mx×my; the edge direction of the model image is $M_\theta(x,y)$; the edge magnitude of the model is $M_w(x,y)$; and the edge direction of the inputted image is $I_q(x,y)$. The evaluating function for determining the difference between the edge directions is defined as follows:

$$f(\omega) = \begin{cases} 1 & \{(-45 + 360n)° \leq \omega \leq (45 + 360n)°\} \\ -1 & \{(135 + 360n)° \leq \omega \leq (225 + 360n)°\} \\ 0 & \{others\}, \end{cases}$$

where n is an integer.

When the model image is made from a mark on a plain object shown in the Image 0, the correlation R with the Image 1 is about 0.93; the Image 0 shows a mark on the object which has the background pattern.

When there is no object whose surface is plain, the model image is made from a mark on the object which has the background pattern. In this case, the similarity will be lower, in other words, the precision of recognition will be lower. For example, if a model image is made from the Image 4, the correlation with the Image 1 is 0.74 and the Image 4 is not stably recognized. Therefore, when the model is made from a mark on the object which has the background pattern, the calculated correlation is not performed satisfactorily.

The forth embodiment describes an image processing apparatus which calculates the similarity satisfactorily, even if the model is made from a mark on the object which has the background pattern. The above image processing apparatus makes a model image from a plurality of object's images.

Figure 30:
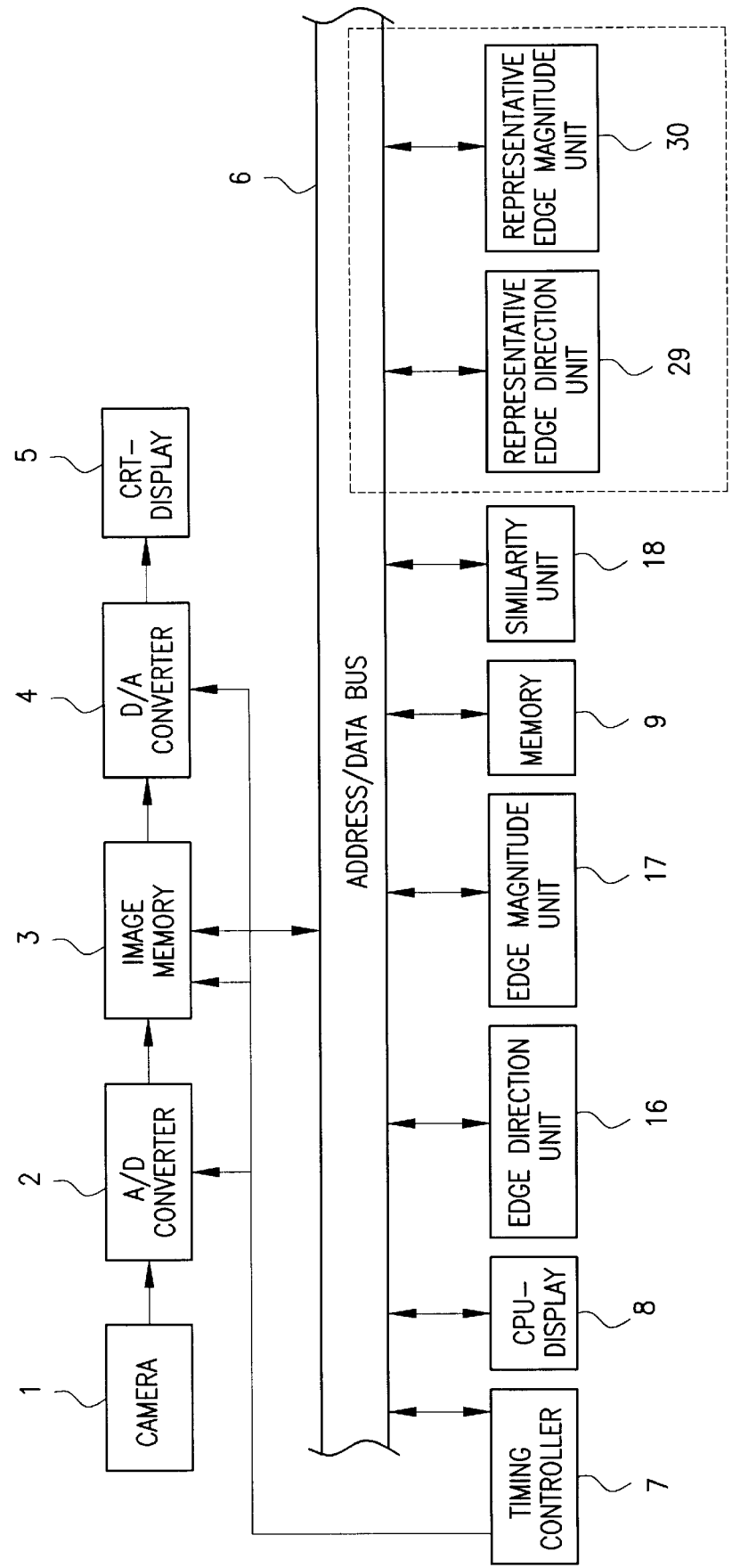
FIG. 30 is a schematic block diagram of an image processing apparatus for calculating a image similarity.
Figure 31:
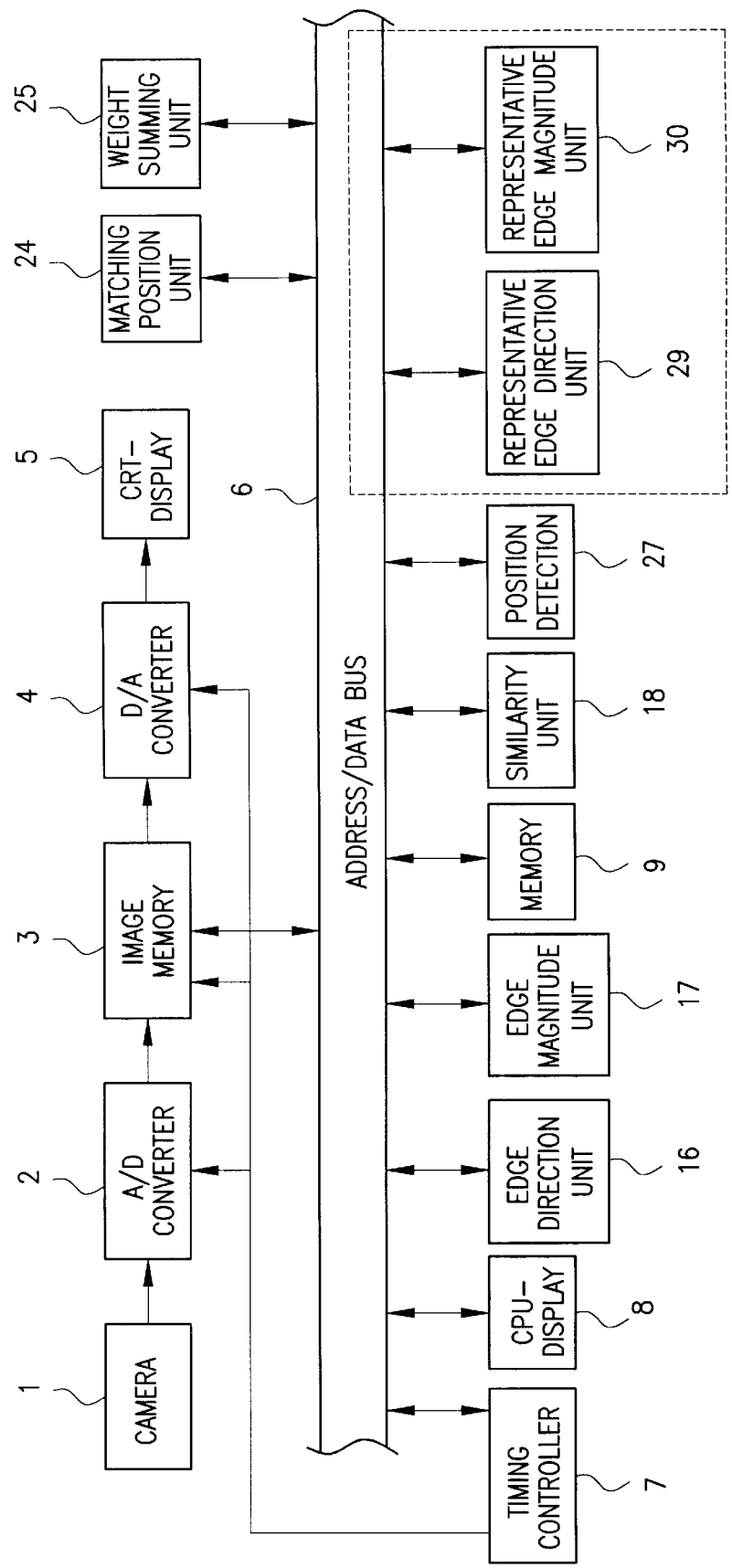
FIG. 31 is a schematic block diagram of a position detecting apparatus.

FIG. 30 is a schematic block diagram of an image processing apparatus for calculating the similarity. FIG. 31 is a schematic block diagram of a position detecting apparatus. FIG. 30 adds to the image processing apparatus shown in FIG. 1 a representative edge direction unit 29 and a representative edge magnitude unit 30. FIG. 31 adds to the position detecting apparatus in FIG. 9, a representative edge direction unit 29 and a representative edge magnitude unit 30. The following describes the process of how to get information for calculating a representative edge direction and a representative edge magnitude.

As shown in FIG. 30, the camera 1 inputs the image of the mark on the object which has various background patterns. An analog image signal which is outputted from the camera 1, is converted a digital image signal by the A/D converter 2, synchronized with a timing signal from the timing controller 7. The converted digital image signal is stored in the image memory 3. In accordance with the above-mentioned procedures in the fourth embodiment, five pieces of the model images (FIG. 27) whose size are mx×my, are stored in the image memory 3. The edge direction $M_\theta(i,x,y)$ is calculated from the edge direction unit 16 at the position (x,y) ($0 \leq x \leq (mx-1), 0 \leq y \leq (my-1)$) of the image i ($1 \leq i \leq N$) stored in the image memory 3. Also, the edge magnitude $M_w(i,x,y)$ is calculated from the edge magnitude unit 17 at the position (x,y) ($0 \leq x \leq (mx-1), 0 \leq y \leq (my-1)$) of the image i ($1 \leq i \leq N$) stored in the image memory 3. The calculated edge direction $M_\theta(i,x,y)$ and edge magnitude $M_w(i,x,y)$ are stored in the memory 9. The representative edge direction $M_{\theta p}(x,y)$ of the position (x,y) is calculated from the representative edge direction unit 29 in accordance with $M_\theta(i,x,y)$. Also, the representative edge magnitude $M_{wp}(x,y)$ of the position (xy) is calculated from the representative edge magnitude unit 30 in accordance with a value of $M_w(i,x,y)$.

Figure 32:
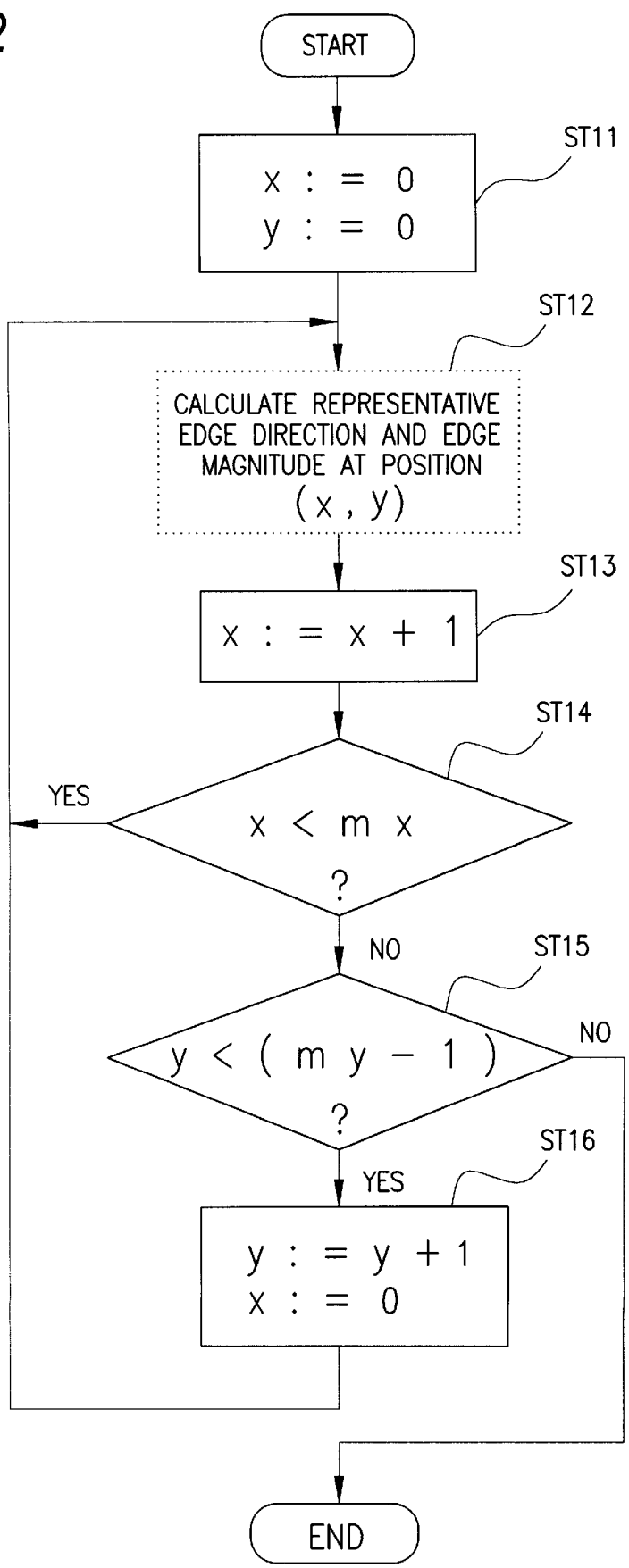
FIG. 32 is a flow chart for calculating a representative edge direction and a representative edge magnitude.

FIG. 32 shows a flow chart in which a representative edge direction and a representative edge magnitude are calculated at every position (x,y) ($0 \leq x \leq (mx-1), 0 \leq y \leq (my-1)$). To begin with, in a step ST11 parameters x and y are set to 0. In a step ST12 the representative edge direction and the representative edge magnitude is calculated at each position shown in FIGS. 33–36. In a step ST13 the parameter x is incremented by 1. In a step ST14 it repeat steps from ST12 to ST13 until the parameter x reaches; mx and if x=mx, it outputs NO. In a step ST15 it repeat steps from ST12 to ST16 until the parameter y reaches my-1; and if y=my-1, the procedure ends. In a step ST16 the parameter y is incremented by 1, and the parameter x is set to 0.

Figure 33:
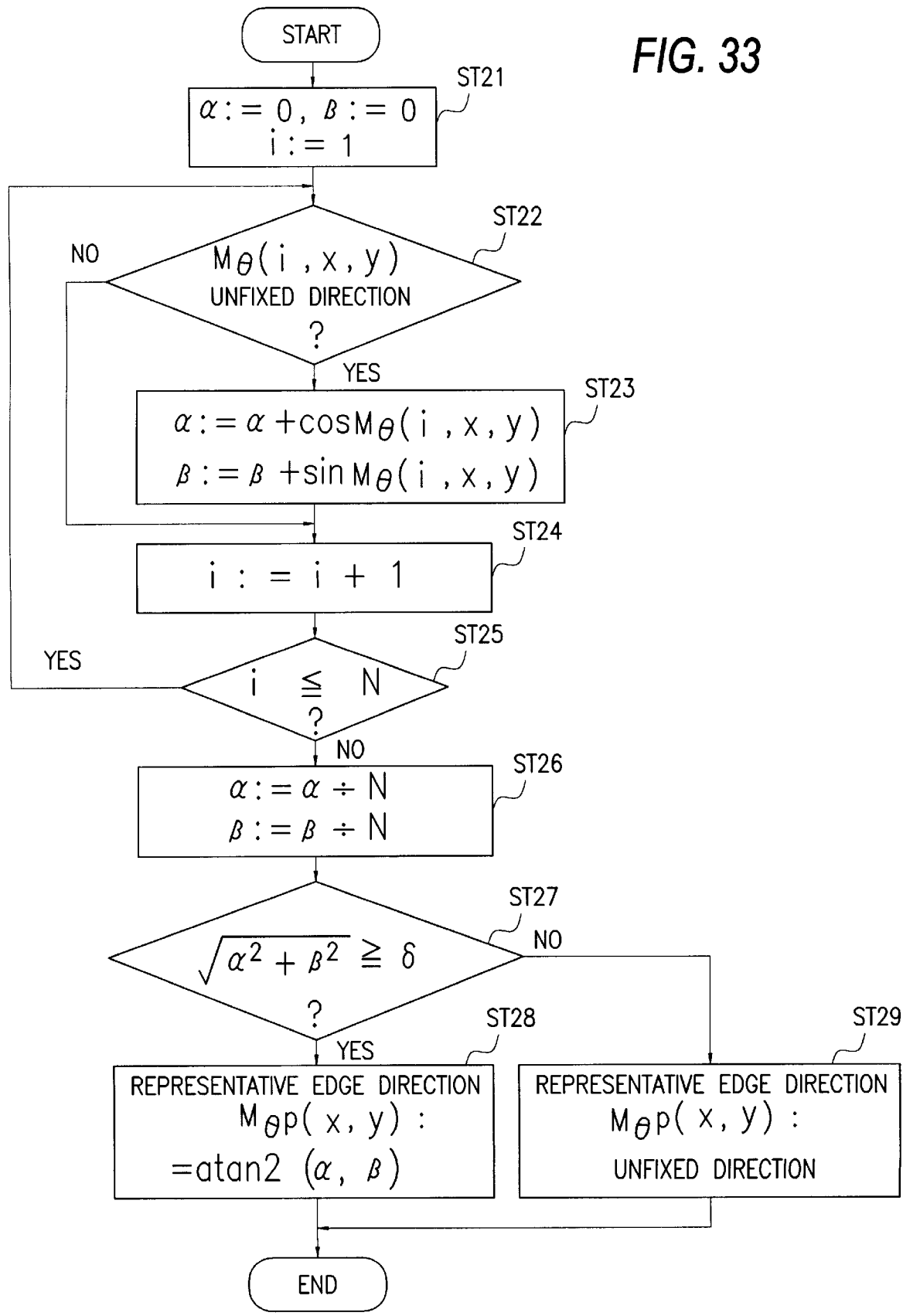
FIG. 33 is a flow chart of a representative edge direction unit.

FIG. 33 shows a flow chart of the representative edge direction unit 29. In a step ST21 parameter α is set to 0, β is set to 0, i is set to 1 initially. In a step ST22 if $M_\theta(i,x,y)$ is not the unfixed direction(ND), the sequence returns to a step ST23, else the sequence returns to a step ST24. In a step ST23 it calculates $\alpha = \alpha + \cos M_\theta(i,x,y)$, $\beta = \beta + \sin M_\theta(i,x,y)$. In a step ST24 parameter i is incremented by 1. If i reaches N, then the sequence returns the step ST22, else the sequence returns a step ST26. In a step ST26 it calculates $\alpha = \alpha/N$, $\beta = \beta/N$, where the value α is calculated as the mean of cosine $M_\theta(i,x,y)$, and the value β is calculated as the mean of sine $M_\theta(i,x,y)$, that is, $$\alpha = \frac{1}{N}\sum_{i=1}^{N} \cos M\theta(i, x, y), \beta = \frac{1}{N}\sum_{i=1}^{N} \sin M\theta(i, x, y).$$

The more of a variant which exists between edge directions $M_\theta(i,x,y)$, the smaller the square root of $\alpha^2 + \beta^2$ becomes. Therefore, the square root of $\alpha^2 + \beta^2$ is a stability index of edge direction $M_\theta(i,x,y)$ at the pixel (x,y). In accordance with α and β, the representative edge direction $M_{\theta p}(x,y)$ is defined as follows:

$$M_{\theta p}(x, y) = \begin{cases} \text{no fixed direction} & \left(\sqrt{\alpha^2 + \beta^2} < \delta\right) \\ \tan^{-1}\frac{\beta}{\alpha} & \text{(other)}, \end{cases}$$

where δ is a predetermined threshold value.

Figure 34:
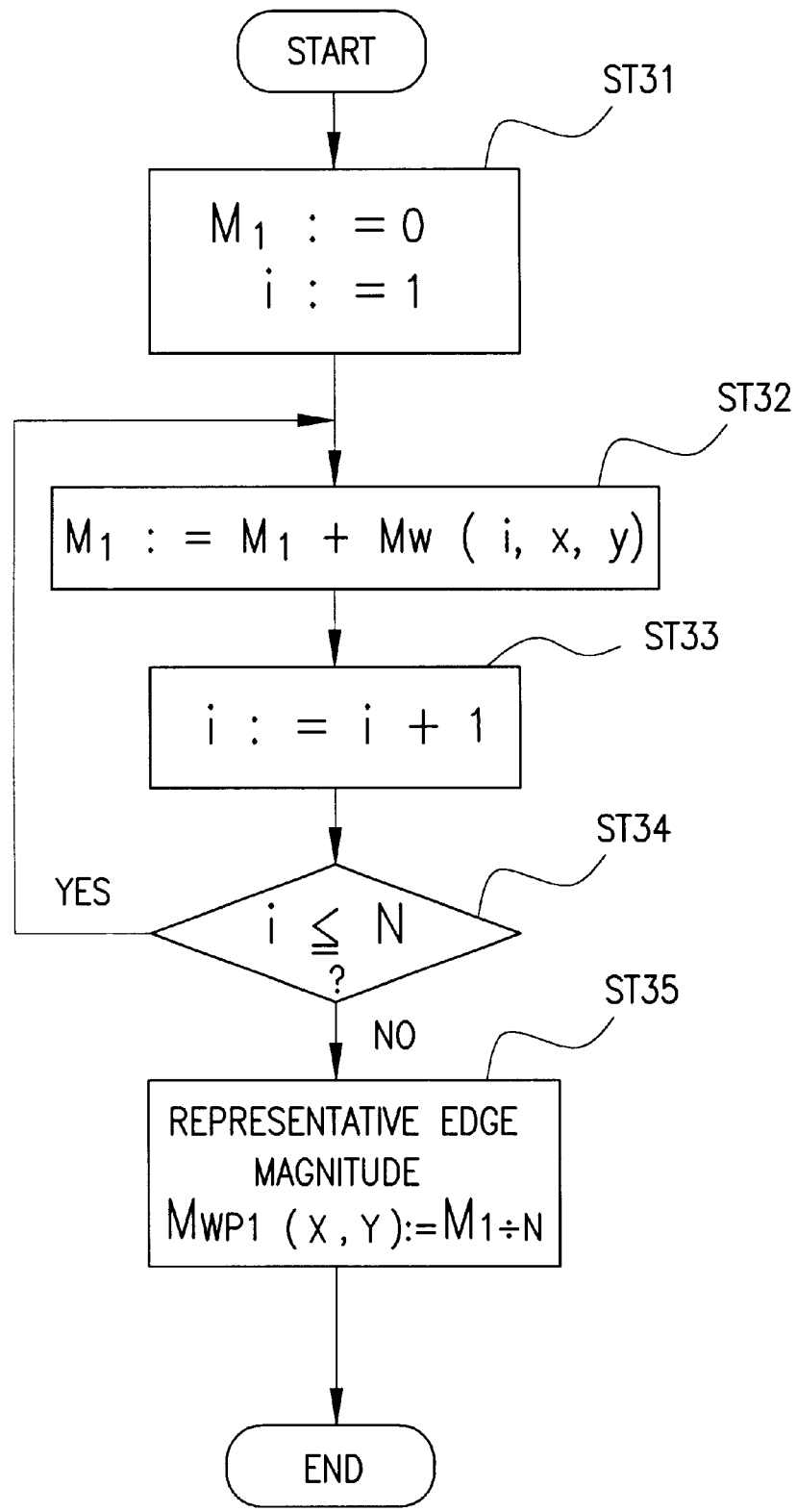
FIG. 34 is a flow chart of a representative edge magnitude unit.

FIG. 34 shows a flow chart of the representative edge magnitude unit 30. In a step ST31 the parameter $M_1$ is set to 0; and the parameter i is set to 1. In a step ST32 $M_1 = M_1 + M_w(i,x,y)$ is calculated. In a step ST33 the parameter i is incremented by 1. In a step ST34 it repeats steps ST32 to ST34 until parameter i reaches N. In a step ST35 the representative edge magnitude $M_{wp1}(x,y)$ is calculated from $M_{wp1}(x,y) = M_1 \div N$. In other words, the representative edge magnitude $M_{wp1}(x,y)$ is the mean of edge magnitude $M_w(i, x,y)$ as follows:

$$M_{wp1}(x, y) = \frac{1}{N}\sum_{i=1}^{N} M_w(i, x, y).$$

Figure 35:
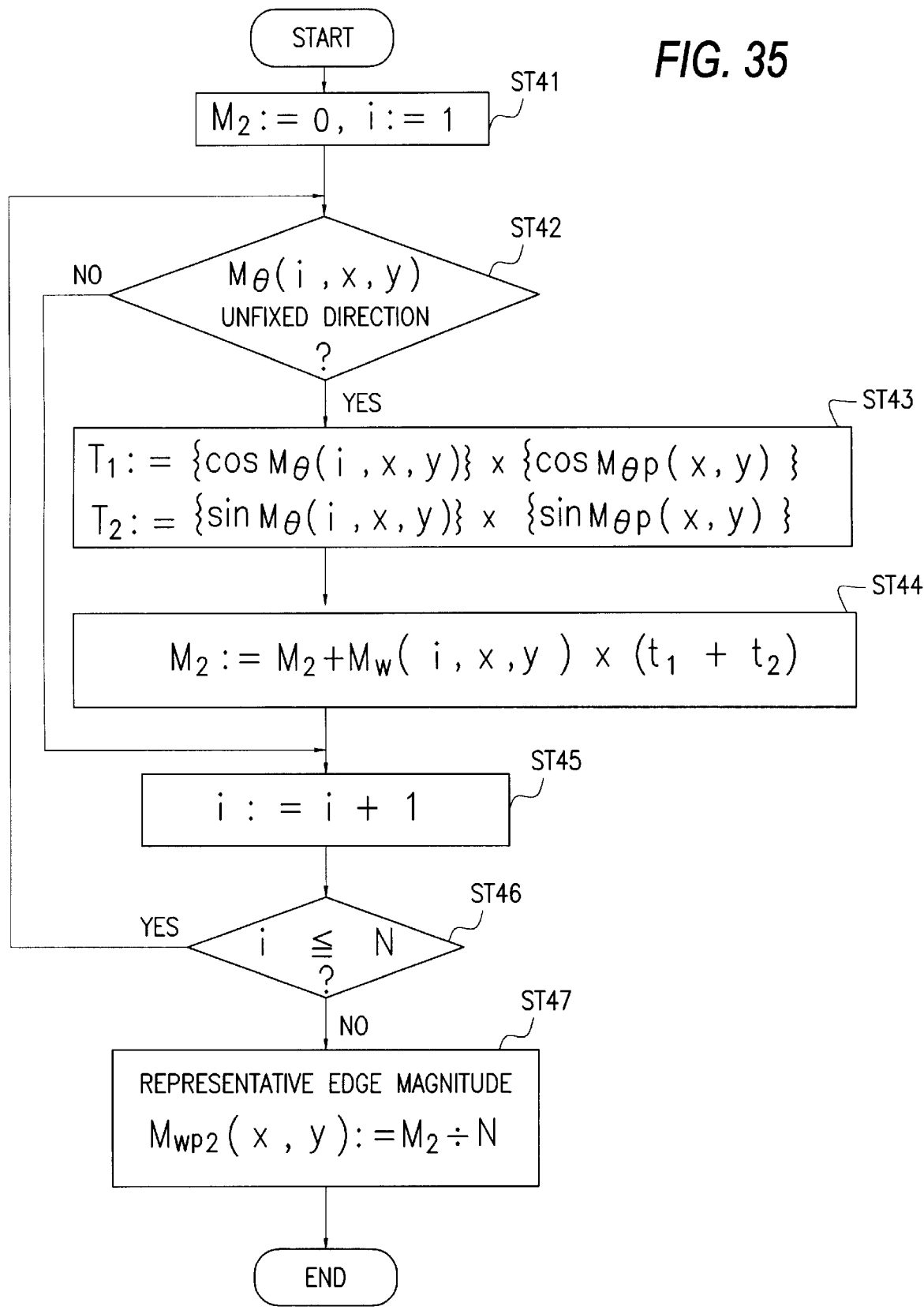
FIG. 35 is another flow chart of a representative edge magnitude unit.

FIG. 35 shows another flow chart of a representative edge magnitude unit 30. In a step ST41 the parameter $M_2$ is set to 0; and the parameter i is set to 1. In a step ST42 if $M_\theta(i,x,y)$ is not an unfixed direction(ND), the sequence returns to a step ST43, otherwise the sequence returns to step ST45. In step ST43 $t_1 = \{\cos M_\theta(i,x,y)\} \times \{\cos M_{\theta p}(x,y)\}$ and $t_2 = \{\sin M_\theta(i,x,y)\} \times \{\sin M_{\theta p}(x,y)\}$ are calculated. In a step ST44 $M_2 = M_2 + M_w(i,x,y) \times (t_1 + t_2)$ is calculated. In a step ST45 the parameter i is incremented by 1. In a step ST46 it repeats steps from ST42 to ST45, until parameter i reaches N. In a step ST46 if the parameter i reaches N, in a step ST47 the $M_2$ is calculated as follows:

$$M_2 = \sum_{i=1}^{N} [M_w(i, x, y) \times$$

$$\{\cos M_\theta(i, x, y) \times \cos M_{\theta p}(x, y) + \sin M_\theta(i, x, y) \times \sin M_{\theta p}(x, y)\}],$$

where $M_{\theta p}(x,y)$ is the representative edge direction whose magnitude is 1, $M_w(i,x,y)$ is the edge magnitude of the model image, and $M_\theta(x,y)$ is the edge direction of the model image. The representative edge magnitude is calculated from the quotient $M_2$ divided by N as follows:

$$M_{wp2}(x,y) = M_2 \div N.$$

The further edge direction $M_\theta(i,x,y)$ is from the representative edge direction $M_{\theta p}(x,y)$, the smaller the edge magnitude $M_w(i,x,y)$ effects representative edge magnitude $M_{wp2}$.

Figure 36:
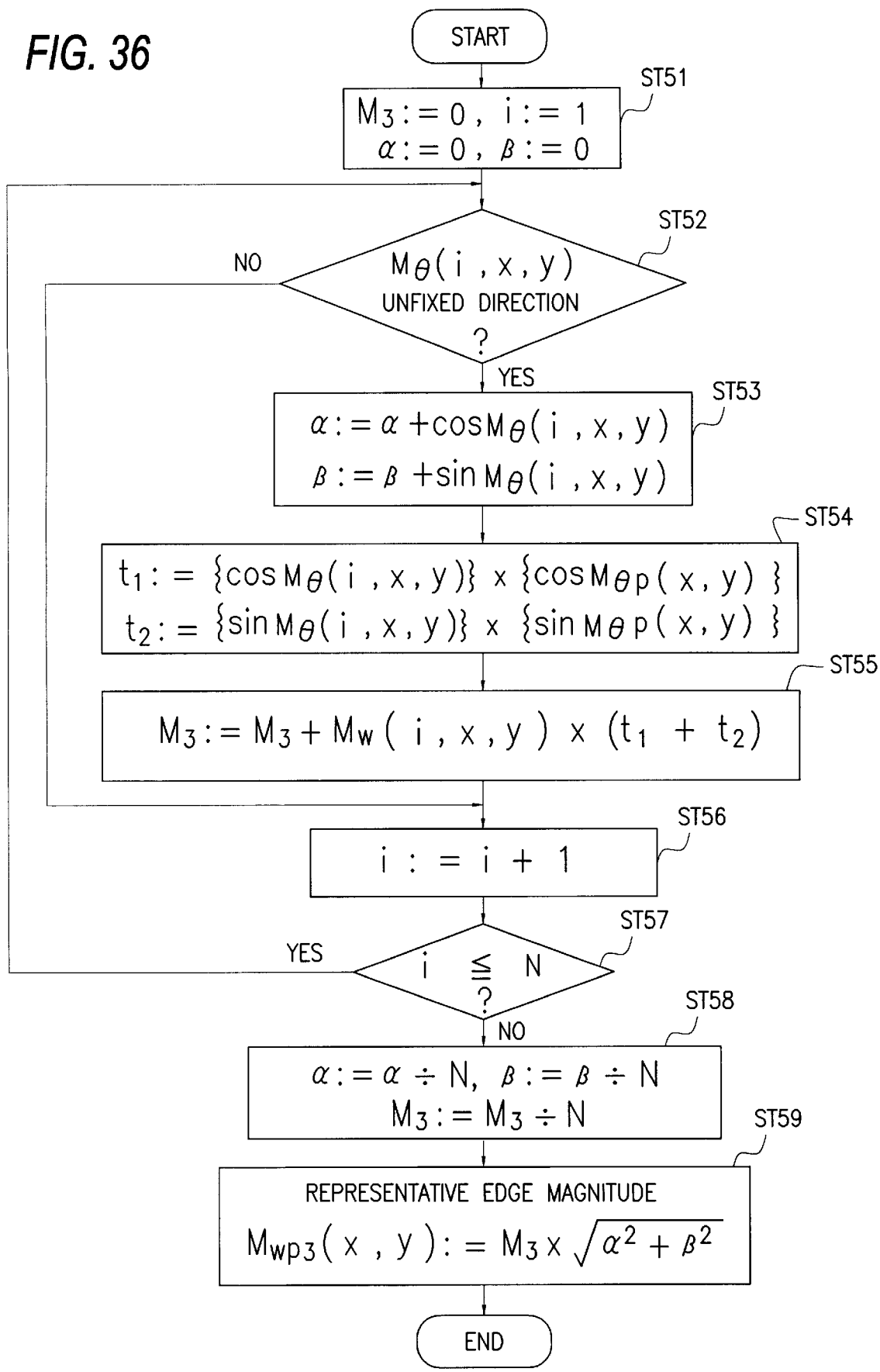
FIG. 36 is another flow chart of a representative edge magnitude unit.

FIG. 36 shows other flow chart of the representative edge magnitude unit 30. In a step ST51 the parameter $M_3$ is set to 0; the parameter i is set to 1; the parameter a is set to 0; and the parameter β is set to 0. In a step ST52 if $M_\theta(i,x,y)$ is not an unfixed direction(ND), the sequence returns to a step ST53, else the sequence returns to a ST53. In a step ST53 $\alpha = \alpha + \cos M_\theta(i,x,y)$ and $\beta = \beta + \sin M_\theta(i,x,y)$ are calculated. In a step ST54 $t_1 = \{\cos M_\theta(i,x,y)\} \times \{\cos M_{\theta p}(x,y)\}$ and $t_2 = \{\sin M_\theta(i,x,y)\} \times \{\sin M_{\theta p}(x,y)\}$ are calculated. In a step ST55 $M_3 = M_3 + M_w(i,x,y) \times (t_1 + t_2)$ is calculated. In a step ST56 the parameter i is incremented by 1. In a step ST57 it repeats the steps from ST52 to ST56, until the parameter i reaches N. In a step ST57 if the parameter i reaches N, in a step ST58 $\alpha = \alpha \div N$, $\beta = \beta \div N$ and $M_3 = M_3 \div N$ are calculated; where α is the mean-cosine of edge direction $M_\theta(i,x,y)$; and β is the mean-sine of edge direction $M_\theta M(i,x,y)$. In other word, α and β are as follows:

$$\alpha = \frac{1}{N}\sum_{i=1}^{N} \cos M_\theta(i, x, y), \beta = \frac{1}{N}\sum_{i=1}^{N} \sin M_\theta(i, x, y).$$

The $M_3$ is calculated from inner product of the first vector whose magnitude is 1 and whose direction is the representative edge direction $M_{\theta p}(x,y)$, and the second vector whose magnitude is the edge magnitude $M_w(i,x,y)$ and whose direction is the edge direction $M_\theta(i,x,y)$ as follows:

$$M_3 = \sum_{i=1}^{N} [M_w(i, x, y) \times \{\cos M_\theta(i, x, y) \times \cos M_{\theta p}(x, y) +$$
$$\sin M_\theta(i, x, y) \times \sin M_{\theta p}(x, y)\}].$$

Furthermore, $M_3$ is divided by N; and $M_3$ is set to the quotient. In a step ST59 the representative edge magnitude is calculated as follows:

$$M_{wp3}(x, y) = M_3 \times \sqrt{\alpha^2 + \beta^2}$$

where $$\sqrt{\alpha^2 + \beta^2}$$

is an index of stability. The more variant the edge direction $M_\theta(i,x,y)$ is, the smaller the representative edge magnitude $M_{pw3}(x,y)$ becomes.

As shown in FIGS. 37, 38, the representative edge direction $M_{\theta p}(x,y)$ and the representative edge magnitude $M_{pw1}(x,y)$ are calculated from Image 1–4, where the threshold value δ is 0. The similarity between the model image and the Image 1 is calculated to about 0.89.

As shown in FIG. 39, the representative edge direction $M_{\theta p}(x,y)$ and the representative edge magnitude $M_{pw2}(x,y)$ are calculated from the Image 1–4, where threshold value δ is 0. The similarity between the model image and the Image 1 is calculated to about 0.89.

As shown in FIG. 40, the representative edge direction $M_{\theta p}(x,y)$ and the representative edge magnitude $M_{pw3}(x,y)$ are calculated from the Image 1–4, where the threshold value δ is 0. The similarity between the model image and the Image 1 is calculated to about 0.97.

In any above-mentioned case, the calculated similarity is near the similarity between the Image 0 and Image 1.

What is claimed is:

1. An image processing apparatus for determining a similarity between first image data and second image data conprising:
    an edge direction unit for determining an edge direction at each pixel of said first image data and an edge direction at each pixel of said second image data;
    an edge magnitude unit for determining an edge magnitude at each pixel of one of said images; and
    a similarity unit for determining a similarity between said first and second images by reducing a background contrast by using the edge directions and magnitudes for each pixel of said one image and edge directions for each pixel of the other of said images.

2. An image processing apparatus as in claim 1, wherein said one image is a model image and said other image is an image which is input to said processing apparatus for similarity comparison with said model image.

3. An image processing apparatus as in claim 1, wherein said similarity unit comprises a difference calculating unit for determining the difference between edge directions of said first and second images.

4. An image processing apparatus as in claim 3, wherein said similarity unit further comprises:
    an evaluation unit for evaluating the differences between the edge directions of said first and second images determined by said difference calculating unit.

5. An image processing apparatus as in claim 4, wherein said similarity unit further comprises:
    a summing unit for summing evaluating values obtained from said evaluation unit in accordance with the edge magnitudes of said other image to produce a degree of similarity.

6. An image processing apparatus as in claim 5, wherein said similarity unit further comprises:
    a division unit for dividing the degree of similarity produced by said summing unit by a summing of the edge magnitude values of said other image.

7. An image processing apparatus as in claims 5 or 6, wherein said weighting is in accordance with a sum of the edge magnitudes of said other image.

8. An image processing apparatus according to claims 5 or 6, wherein said evaluation unit calculates a cosine of a value produced by subtracting edge directions of each pixel of said first and second images.

9. An image processing apparatus as in claims 5 or 6, wherein said difference calculating unit subtracts the edge directions of said first and second images, and wherein said evaluation unit operates such that if said subtraction is between first predetermined values which includes 0, said evaluating-value is 1, and if said subtraction is between second predetermined values, said evaluating-value is –1, and if said subtraction is between third predetermined values, said evaluating-value is 0.

10. An image processing apparatus in accordance with claims 5 or 6, wherein said summing unit sums those weighted evaluating-values which are greater than a predetermined value.

11. An image processing apparatus in accordance with claims 5 or 6, wherein said edge direction unit calculates edge directions at a predetermined region of said first image data, and said evaluating difference of edge direction unit calculates evaluating-values by subtracting said edge directions from edge directions at predetermined regions of said second image data.

12. An image processing method for determining a similarity between first image data and second image data comprising the steps of:
    (a) calculating edge directions at each pixel of said first image data and calculating edge directions at each pixel of said second image data;
    (b) calculating evaluating-values by talkng the difference between the edge direction of each pixel of said first image data from an edge direction of each pixel of said second image data and reducing a background contrast;
    (c) associating weight-values to said evaluating-values, said weight-values being calculated from one of said image data; and
    (d) summing the weight associated evaluating-values at each pixel and providing an indication of a degree of similarity between said first and second image data based on the result of the summing.

13. An image processing method according to claim 12, wherein said weight-value is a sum of an edge magnitude at each pixel of said one image data.

14. An image processing method according to claim 12, wherein said calculating evaluating-values step takes a cosine function of values produced by subtracting said the edge direction of corresponding pixels of said first and second image data.

15. An image processing method according to claim 12, wherein if said subtraction is between first predetermined values which includes 0, said evaluating-value is 1, and if said subtraction is between second predetermined values, said evaluating-value is –1, and if said subtraction is between third predetermined values, said evaluating-value is 0.

16. A position detecting apparatus for detecting an image position comprising:
- an edge direction unit for determining an edge direction at each pixel of said first image data and an edge direction at each pixel of said second image data;
- an edge magnitude unit for determining an edge magnitude t each pixel of one of said images;
- a similarity unit for determining a similarity between said first and second images by reducing a background contrast by using the edge directions and magnitudes for each pixel of said one image and edge directions for each pixel of the other of said images;
- a scanner for causing a similarity between said first and second images to be determined at a plurality of scanning locations where said first and second images are shifted relative to each other; and
- a position detector for detecting a position of said first image data relative to said second image data which produces the highest similarity.

17. An image processing apparatus for determining a similarity between first image data and second image data comprising:
- an image memory unit for storing a plurality of second image data;
- an edge direction unit for determining an edge direction at each pixel of said first image data and an edge direction at each pixel of said second image data;
- an edge magnitude unit for determining an edge magnitude at each pixel of one of said images;
- a similarity unit for determining a similarity between said first and second images by reducing a background contrast by using the edge directions and magnitudes for each pixel of said one image and edge direction for each pixel of the other of said images;
- said similarity being determined between said first image data and each of said second image data, said memory unit storing the similarities determined between said image data and each of said second image data; and
- a maximum similarity memory for storing the maximum similarity among the similarities determined with respect to all of said second images.

18. An image processing apparatus for determining a similarity between a first image data and a second image data comprising:
- an edge direction unit for determining an edge direction at each pixel of said first image data and an edge direction at each pixel of a plurality of said second image data;
- an edge direction memory for storing edge directions of pixels of a plurality of said second image data;
- a representative edge direction unit for calculating a representative edge direction from said stored edge directions of pixels of said plurality of said second image data;
- an evaluating difference of edge direction unit for calculating evaluating-values obtained by subtracting edge directions of the pixels of said first image data form pixels of representative edge directions of corresponding pixels and reducing a background contrast;
- a weighting unit for weighting a value calculated film said second image data to said evaluating-values; and
- a summing unit for summing weighted evaluating-values at each pixel of said second image data.

19. An image processing apparatus according to claim 18, wherein said representative edge direction unit calculates a mean of the edge directions of the pixels of a plurality of said second image data.

20. An image processing apparatus according to claim 18, wherein said weighting value is an edge magnitude of at each pixel of said second image data.

21. An image processing apparatus according to claim 18, wherein said weighting value is an representative edge magnitude at each pixel, and said representative edge magnitude is calculated from edge magnitudes of the pixels of said plurality of said second image data.

22. An image processing apparatus according to claim 18, wherein said weighting value is an representative edge magnitude at each pixel, and said representative edge magnitude is a mean of edge directions of the pixels of said plurality of said second image data.

23. A position detecting apparatus for detecting an image position comprising:
- an edge direction unit for determining edge directions at each pixel of a first image data and edge directions of each pixel of a second image data;
- an edge direction memory for storing edge directions of pixels of a plurality of said second image data;
- a representative edge direction unit for calculating a representative edge direction from said stored edge directions of pixel of said plurality of said second image data;
- an evaluating difference of edge direction unit for calculating evaluating-values obtained by subtracting said edge direction of the pixels of said first image data form representative edge directions of corresponding pixels and reducing background contrast;
- a weighting unit for weighting values calculated from said second image data to said evaluating-value;
- a summing unit for summing weighted evaluating-values at each pixel of said second image data;
- a scanner for scanning a similarity between said first and second image data to be determined at a plurality of scanning locations where said first and second images data are shifted relative to each other; and
- a position detector for detecting a position of said first image data relative to said second image data which produces the highest similarity.

* * * * *